(12) United States Patent
Tokushima et al.

(10) Patent No.: US 10,804,518 B2
(45) Date of Patent: Oct. 13, 2020

(54) ANION CONDUCTING MEMBRANE

(71) Applicant: Nippon Shokubai Co., Ltd., Osaka-shi, Osaka (JP)

(72) Inventors: Hiroki Tokushima, Osaka (JP); Hironobu Akutagawa, Osaka (JP); Hiroko Harada, Osaka (JP); Yasuyuki Takazawa, Osaka (JP); Satoshi Ogawa, Osaka (JP); Keisuke Kikuchi, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 165 days.

(21) Appl. No.: 15/579,094

(22) PCT Filed: May 30, 2016

(86) PCT No.: PCT/JP2016/065911
§ 371 (c)(1),
(2) Date: Dec. 1, 2017

(87) PCT Pub. No.: WO2016/194872
PCT Pub. Date: Dec. 8, 2016

(65) Prior Publication Data
US 2018/0175354 A1    Jun. 21, 2018

(30) Foreign Application Priority Data
Oct. 29, 2015 (JP) .................................. 2015-213143

(51) Int. Cl.
*H01M 8/04* (2016.01)
*H01M 2/16* (2006.01)
(Continued)

(52) U.S. Cl.
CPC ............. *H01M 2/1653* (2013.01); *B32B 5/24* (2013.01); *B32B 7/02* (2013.01); *C08F 220/14* (2013.01);
(Continued)

(58) Field of Classification Search
CPC ...................................................... H01M 8/04
See application file for complete search history.

(56) References Cited

U.S. PATENT DOCUMENTS

| | | | |
|---|---|---|---|
| 6,627,346 | B1 | 9/2003 | Kinouchi et al. |
| 2002/0148723 | A1 | 10/2002 | Takata et al. |

(Continued)

FOREIGN PATENT DOCUMENTS

| | | |
|---|---|---|
| CN | 103881132 | 6/2014 |
| DE | 28 42 724 | 4/1979 |

(Continued)

OTHER PUBLICATIONS

Kagaku Dictionary 8, Written version, Kyoritsu Kabushiki Kaisha, nineteenth printing, p. 742, Table II with a concise explanation.

(Continued)

*Primary Examiner* — Jacob B Marks
(74) *Attorney, Agent, or Firm* — Hamre, Schumann, Mueller & Larson, P.C.

(57) ABSTRACT

Provided is a material capable of further extending the life of a cell including a zinc species as a negative electrode active material. The present invention relates to an anion conducting membrane formed using an anion conducting membrane-forming material, the anion conducting membrane-forming material including a conjugated diene based polymer and/or a (meth)acrylic based polymer, and a compound containing at least one element selected from Groups I to XVII of the periodic table, the anion conducting membrane having a cross-section in which a ratio of a
(Continued)

US 10,804,518 B2

Page 2 combined area of particles of the compound containing at least one element selected from Groups I to XVII of the periodic table to a combined area of the components of the anion conducting membrane-forming material other than the compound (particles of the compound/components of the anion conducting membrane-forming material other than the compound) is 70/30 to 30/70.

19 Claims, 2 Drawing Sheets

(51) Int. Cl.

| H01B 1/10 | (2006.01) |
| H01B 1/08 | (2006.01) |
| C08L 101/00 | (2006.01) |
| B32B 7/02 | (2019.01) |
| H01B 1/12 | (2006.01) |
| B32B 5/24 | (2006.01) |
| H01B 1/06 | (2006.01) |
| H01M 10/24 | (2006.01) |
| C08K 3/00 | (2018.01) |
| H01M 4/24 | (2006.01) |
| C08F 220/14 | (2006.01) |
| C08F 220/68 | (2006.01) |
| C08L 9/06 | (2006.01) |
| C08L 33/10 | (2006.01) |
| C08L 33/12 | (2006.01) |
| H01M 10/28 | (2006.01) |

(52) U.S. Cl.
CPC .............. *C08F 220/68* (2013.01); *C08K 3/00* (2013.01); *C08L 9/06* (2013.01); *C08L 33/10* (2013.01); *C08L 33/12* (2013.01); *C08L 101/00* (2013.01); *H01B 1/06* (2013.01); *H01B 1/08* (2013.01); *H01B 1/10* (2013.01); *H01B 1/12* (2013.01); *H01M 2/162* (2013.01); *H01M 2/166* (2013.01); *H01M 2/1666* (2013.01); *H01M 2/1686* (2013.01); *H01M 4/244* (2013.01); *H01M 10/24* (2013.01); *H01M 10/28* (2013.01); *C08L 2205/03* (2013.01)

(56) References Cited

U.S. PATENT DOCUMENTS

| 2008/0057388 A1 | 3/2008 | Kono |
| 2008/0057389 A1 | 3/2008 | Kono et al. |
| 2014/0315099 A1 | 10/2014 | Yamada et al. |
| 2015/0364789 A1 | 12/2015 | Ogawa et al. |
| 2015/0364790 A1 | 12/2015 | Yonehara et al. |

FOREIGN PATENT DOCUMENTS

| EP | 1840993 | | 10/2007 |
| GB | 2 005 289 | | 4/1979 |
| JP | 54-61648 | | 5/1979 |
| JP | 5-144431 | | 6/1993 |
| JP | 2000-248088 | | 9/2000 |
| JP | 2001-002815 | | 1/2001 |
| JP | 2001-135295 | | 5/2001 |
| JP | 2002-200670 | | 7/2002 |
| JP | 2002-201298 | | 7/2002 |
| JP | 2010-502471 | | 1/2010 |
| JP | 2010-502472 | | 1/2010 |
| JP | 2013-054877 | | 3/2013 |
| JP | 2013-134896 | | 7/2013 |
| JP | 2014-167910 | | 9/2014 |
| JP | 2015-005493 | | 1/2015 |
| JP | 2015-015229 | | 1/2015 |
| JP | 2015-095286 | | 5/2015 |
| WO | 2013/118561 | | 8/2013 |
| WO | 2014/119665 | | 8/2014 |
| WO | WO 2014-119665 | * | 8/2014 |

OTHER PUBLICATIONS

Fedelich, "Application Handbook Thermal Analysis of Polymers Selected Applications Thermal Analysis", Jan. 1, 2013, XP055608279, retrieved from Internet: https://www.mt.com/dam/LabDiviguides-glen/ta-polymer/TA_Polymers_Selected_Apps_EN.pdf [retrieved on Jul. 24, 2019].

* cited by examiner

ANION CONDUCTING MEMBRANE

TECHNICAL FIELD

The invention relates to an anion conducting membrane. Specifically, the invention relates to an anion conducting membrane particularly suitable for components of cells such as storage cells including a zinc negative electrode, a cell component containing the anion conducting membrane, and a cell including the cell component.

BACKGROUND ART

In recent years, the importance of cells has been rapidly increasing in various industries from small mobile devices to large products such as automobiles. This trend has brought various newly developed or improved cell systems particularly excellent in terms of capacity and energy density and excellent for use as secondary batteries. For example, along with spread of the use of cells, zinc negative electrodes containing a zinc species as a negative electrode active material have been studied for a long time. In particular, air-zinc primary cells, manganese-zinc primary cells, and silver-zinc primary cells have been practically widely used throughout the world.

However, use of zinc negative electrodes in storage cells causes a problem. Specifically, dendrites formed on the surface of the negative electrode during charging cause a short circuit between the positive electrode and the negative electrode, resulting in a failure in charging and discharging of the cell.

In order to solve such a problem, many techniques have been developed. For example, an alkaline secondary cell is disclosed which includes a positive electrode, a negative electrode containing at least one of zinc and a zinc compound as a negative electrode active material, a coating containing an ion exchange resin which is formed on the negative electrode or the negative electrode active material, and an electrolyte containing an alkaline aqueous solution as an electrolyte solution. At least one selected from the group consisting of the negative electrode, the coating, and the electrolyte contains at least one selected from the group consisting of metals that have a nobler potential than a standard electrode potential of zinc and a melting point lower than that of zinc, oxides containing any of the metals, salts containing any of the metals, and ions containing any of the metals (see, for example, Patent Document 1). In addition, a zinc negative electrode active material for use in zinc alkaline secondary batteries is disclosed which is covered with a hydroxide that is substantially insoluble in an alkaline aqueous solution and is not accompanied by an oxidation-reduction reaction in the potential range of charge-discharge reaction of the cell (see, for example, Patent Document 2). Further, a technique of suppressing the formation of dendrites by forming a separator from an anion conducting material that contains a polymer and a compound containing at least one element selected from Groups I to XVII of the periodic table is disclosed (see, for example, Patent Document 3).

Also, a technique is disclosed in which a material similar to an anion conducting material, containing a polymer and a compound containing at least one element selected from Groups I to XVII of the periodic table is used as a negative electrode mixture of a lithium ion secondary battery (see, for example, Patent Document 4).

As described above, anion conducting membranes selectively permeable to ions in a solution are variously examined for use as materials of storage cells, specifically for use in separators between positive and negative electrodes, electrolytes, and electrode protection membranes of storage cells.

In addition to the aforementioned membranes, porous membranes for use as cell separators are disclosed as prior ion conducting membranes, for example (see, for example, Patent Documents 5 to 7). Further, a separator made from a hydroxide ion-conducting inorganic solid electrolyte is disclosed (see, for example, Patent Document 8).

CITATION LIST

Patent Document

Patent Document 1: JP 2013-54877 A
Patent Document 2: JP H05-144431 A
Patent Document 3: WO 2014/119665
Patent Document 4: JP 2013-134896 A
Patent Document 5: JP 2002-201298 A
Patent Document 6: JP 2001-135295 A
Patent Document 7: JP 2001-2815 A
Patent Document 8: WO 2013/118561

SUMMARY OF INVENTION

Technical Problem

As described in Patent Documents 1 to 4, various methods have been developed for extending the lifes of cells including a zinc species as a negative electrode active material by suppressing a short circuit between positive and negative electrodes due to dendrite growth. However, there is still a strong need for a further extended cell life, and materials capable of the extending cell life need to be developed.

Since the porous membranes disclosed in Patent Documents 5 to 7 have through holes, they, when used as cell separators, need to be improved so as to suppress dendrite growth owing to separators to extend the cell life. Further, Patent Document 8 discloses a separator made from a hydroxide ion-conducting inorganic solid electrolyte. The inorganic solid electrolyte has no flexibility, and is less likely to be deformed. In addition, such an inorganic solid electrolyte still has room for improvement in extending the cell life by further sufficiently suppressing dendrite growth.

In order to practically use cells such as storage cells containing a zinc negative electrode, the present inventors have tried to develop ion conducting membranes such as anion conducting membranes permeable to ions involved in cell reaction, preventing impairment of the cell performance, and completely suppressing the formation and growth of dendrites. However, such proposed ion conducting membranes (e.g. the anion conducting material disclosed in Patent Document 3) still have room for improvement in more sufficiently suppressing dendrite growth.

The invention has been made in view of the state of the art, and aims to provide a material capable of further extending the life of a cell including a zinc species as a negative electrode active material.

Solution to Problem

As a result of various studies for solving the above problems, the inventors found the following.

First, the inventors made various investigations on materials capable of extending the life of a cell including a zinc species as a negative electrode active material. Specifically, the inventors formed an anion conducting membrane using a material for forming an anion conducting membrane (hereinafter, such a material before membrane formation is also referred to as an anion conducting membrane-forming material) which contains a conjugated diene based polymer and a compound containing at least one element selected from Groups I to XVII of the periodic table. Such an anion conducting membrane contains particles of the compound containing at least one element selected from Groups I to XVII of the periodic table and the components of the anion conducting membrane-forming material other than the compound which cover among the particles of the compound. Also the anion conducting membrane has a cross-section in which the ratio of the combined area of the particles of the compound containing at least one element selected from Groups I to XVII of the periodic table to the combined area of the components of the anion conducting membrane-forming material other than the compound falls within a predetermined range. The anion conducting membrane, when used as a separator, has a good selective permeability to hydroxide ions and effectively suppresses dendrite growth, thereby achieving cell life extension. Thus, the present inventors successfully arrived at solutions to the above problems. The present inventors further found that the use of a (meth)acrylic based polymer provides the same effects as those obtained by a conjugated diene based polymer, and successfully arrived at a solution to the above problems, and thus accomplished the invention.

Further, in order to extend the life of cells such as storage cells containing a zinc negative electrode by more effectively suppressing dendrite growth, the present inventors examined a variety of ion conducting membranes for use in cell components such as separators, electrolytes, and electrodes. As a result of the examination, the present inventors found that with regard to more effective suppression of dendrite growth by cell components, a membrane satisfying a specific relation of the air permeance, piercing strength, and density of a membrane to the thickness of the membrane can be a dense, strong membrane that does not impair the cell performance, and thus can more effectively suppress the growth of dendrites such as zinc dendrites when used as a cell component.

Further, the present inventors examined various materials capable of further extending the life of a cell including a zinc species as a negative electrode active material, and focused on the use of an anion conducting membrane containing a conjugated diene based polymer and/or a (meth)acrylic based polymer and a specific inorganic compound. In such an anion conducting membrane, the particle portion of the inorganic compound selectively allows hydroxide ions to pass therethrough, and the conjugated diene based polymer and/or the (meth)acrylic based polymer can more reduce the amount of voids than conventional polymers easily forming fibers such as polytetrafluoroethylene. Thus, dendrite growth is suppressed. In addition, as a result of further examination, the present inventors formed an anion conducting membrane that contains a conjugated diene based polymer and/or a (meth)acrylic based polymer and a specific inorganic compound, and has a liquid absorption rate of 25% or less. The present inventors found that such an anion conducting membrane, when used as a cell separator, can prevent a short circuit between positive and negative electrodes due to the suppression of the amount of an aqueous electrolyte solution retained by hydrophilic functional groups and low-coalescing sites of the conjugated diene based polymer and/or the (meth)acrylic based polymer, and polymer additives. As a result, a cell having a longer life can be obtained.

The present inventors also found that the anion conducting membrane and the ion conducting membrane of the invention are effective even when used as, for example, separators, electrolytes, or electrode protection membranes, in cells free from dendrite problems (e.g. primary cells such as air-zinc cells or alkaline manganese cells). Specifically, the anion conducting membrane and the ion conducting membrane can prevent moving, to the counter electrode, of additives which are contained in an electrode and are reactive with a counter electrode to induce self-discharge, and thus suppress self-discharge.

That is, the invention relates to an anion conducting membrane formed using an anion conducting membrane-forming material, the anion conducting membrane-forming material including:

a conjugated diene based polymer and/or a (meth)acrylic based polymer; and a compound containing at least one element selected from Groups I to XVII of the periodic table, the anion conducting membrane having a cross-section in which a ratio of a combined area of particles of the compound containing at least one element selected from Groups I to XVII of the periodic table to a combined area of the components of the anion conducting membrane-forming material other than the compound (particles of the compound/components of the anion conducting membrane-forming material other than the compound) is 70/30 to 30/70. One aspect of the invention according to this anion conducting membrane is hereinafter also referred to as a first aspect of the invention.

The invention also relates to an anion conducting membrane, wherein the anion conducting membrane satisfies a value X represented by the following equation (1) of 200 or more:

$$X = 0.005 \times \frac{T^2 \times F \times \rho}{L} \tag{1}$$

wherein T represents the air permeance (s); F represents the piercing strength (N); $\rho$ represents the density (g/cm$^3$); and L represents the average membrane thickness (μm). Another aspect of the invention according to this anion conducting membrane is hereinafter also referred to as a second aspect of the invention.

The ion conducting membrane of the second aspect of the invention may be any one that satisfies a value X represented by the equation (1) of 200 or more and allows ions involved in cell reaction to pass therethrough when used as a cell component in ion conducting cells. Examples of the membrane include non-woven fabrics, microporous membranes, anion conducting membranes formed using an anion conducting membrane-forming material that contains a polymer and a compound containing at least one element selected from Groups I to XVII of the periodic table (hereinafter, also referred to as an inorganic compound), and below-described other membranes used as separators.

In particular, the ion conducting membrane, when used in cells employing an anion conduction mechanism, is preferably a microporous membrane or an anion conducting membrane. In order to further extend the cell life, the ion conducting membrane is more preferably an anion conducting membrane. Specifically, the ion conducting membrane of the invention more preferably contains a polymer and a compound containing at least one element selected from Groups I to XVII of the periodic table. The polymer is preferably a conjugated diene based polymer and/or a (meth) acrylic based polymer.

In order to more sufficiently suppress dendrite growth, the value X is more preferably 220 or more, still more preferably 300 or more, particularly preferably 500 or more.

The invention also relates to the anion conducting membrane that contains a conjugated diene based polymer and/or a (meth)acrylic based polymer and at least one inorganic compound selected from the group consisting of oxides, hydroxides, and layered double hydroxides, and has a liquid absorption rate of 25% or less. Another aspect of the invention according to this anion conducting membrane is hereinafter also referred to as a third aspect of the invention.

These inventions are described in detail below.

Any combination of two or more of the individual preferred embodiments of the first aspect of the invention, the second aspect of the invention, or the third aspect of the invention described herein is also a preferred embodiment of the invention.

The term "the invention" herein refers to the first aspect of the invention, unless otherwise stated. Preferred embodiments of the first aspect of the invention may apply to the second aspect of the invention and the third aspect of the invention.

<Anion Conducting Membrane>

The anion conducting membrane of the invention is formed using an anion conducting membrane-forming material that contains a conjugated diene based polymer and/or a (meth)acrylic based polymer and a compound containing at least one element selected from Groups I to XVII of the periodic table. Conventional anion conducting membranes contain many polymers that are fiberized by kneading, such as polytetrafluoroethylene, as a component for bonding compound particles so that the membrane has high strength and excellent flexibility. The present inventors newly found a problem caused by using such polymers easily forming fibers. Specifically, a membrane mainly containing such polymers has many fine voids, and zincate ions pass through the non-ion selective voids to promote dendrite growth in the membrane, resulting in a decrease in the cell life.

On the other hand, the anion conducting membrane of the invention formed using an anion conducting membrane-forming material that contains a conjugated diene based polymer and/or a (meth)acrylic based polymer and a compound containing at least one element selected from Groups I to XVII of the periodic table has a good selective permeability to hydroxide ions that suppresses permeation of zincate ions, but allows hydroxide ions to pass therethrough, and has less voids. Thus, a cell including such a membrane as a separator has a longer life than a cell including a conventional anion conducting membrane. Further, since the anion conducting membrane formed using a conjugated diene based polymer and/or a (meth)acrylic based polymer is resistant to alkali, the membrane is suitable as a material of a cell separator that is to be in contact with an alkaline electrolyte solution. Furthermore, since the conjugated diene based polymer and the (meth)acrylic based polymer can have appropriate affinity for the particles of the compound in the preparation of the membrane and these polymers form hydrophobic sites among the particles in an anion conducting membrane, an anion conducting membrane in which the particles of the compound are uniformly dispersed and permeation of zincate ions is suppressed can be formed.

The anion conducting membrane of the invention has a cross-section in which the ratio of the combined area of particles of the compound containing at least one element selected from Groups I to XVII of the periodic table to the combined area of the components of the anion conducting membrane-forming material other than the compound (particles of the compound/components of the anion conducting membrane-forming material other than the compound) is 70/30 to 30/70. In a cell including a zinc species as a negative electrode active material, in order to suppress the loss of the electrode active material from the electrode, it is preferred that a separator has a selective ion permeability that does not allow zincate ions generated via electrode reaction to pass therethrough, but allows hydroxide ions needed for electrode reaction to pass therethrough. In the cross-section of the anion conducting membrane of the invention, the particle portion of the compound containing at least one element selected from Groups I to XVII of the periodic table allows ions to selectively pass therethrough, and the use of the conjugated diene based polymer and/or the (meth)acrylic based polymer reduces the amount of voids in a portion of the anion conducting membrane-forming material among the particles of the compound to less than those in a conventional membrane containing a polymer easily forming fibers as an anion conducting membrane-forming material component. Thus, the anion conducting membrane suppresses permeation of zincate ions into the membrane while having a good permeability to hydroxide ions, thereby effectively suppressing dendrite growth.

The anion conducting membrane of the invention has only to have at least one cross-section in which the ratio of the combined area of the particles of the compound containing at least one element selected from Groups I to XVII of the periodic table to the combined area of the components of the anion conducting membrane-forming material other than the compound falls within the above predetermined range. In terms of permeability to hydroxide ions, any cross-section of the membrane preferably has a ratio falling within the above predetermined range. More preferably, any surface of the membrane has a ratio falling within the above predetermined range.

The anion conducting membrane of the invention may partially contain independent voids as long as, in the cross-section, the ratio between the combined area of the particles of the compound containing at least one element selected from Groups I to XVII of the periodic table and the combined area of the components of the anion conducting membrane-forming material other than the compound falls within the above range. Voids are possibly formed in the membrane due to air incorporated during kneading of the anion conducting membrane-forming material or among aggregated particles of the compound that contains at least one element selected from Groups I to XVII.

In a preferred embodiment of the anion conducting membrane of the invention, the cross-section of the anion conducting membrane has an area of voids of 3% or less, more preferably 1% or less, still more preferably 0.5% or less, particularly preferably 0.2% or less in the total area of the cross-section of the anion conducting membrane.

The proportion of the area of voids in the cross-section of the anion conducting membrane can be measured by observing the cross-section of the anion conducting membrane with a scanning electron microscope (SEM) according to the method disclosed in the examples.

As described above, in the anion conducting membrane of the invention, the ratio of the combined area of the particles of the compound containing at least one element selected from Groups I to XVII of the periodic table to the combined area of the components of the anion conducting membrane-forming material other than the compound (particles of the compound/components of the anion conducting membrane-forming material other than the compound) is 70/30 to 30/70. The anion conducting membrane having such an area ratio has sufficient strength and exhibits better hydroxide ion conductivity. The ratio of (particles of the compound/components of the anion conducting membrane-forming material other than the compound) is preferably 65/35 to 35/65, more preferably 60/40 to 40/60.

Herein, the area of the particles of the compound containing at least one element selected from Groups I to XVII of the periodic table in the cross-section of the anion conducting membrane is illustrated by the white area in FIGS. 1 and 2, and the area of the components of the anion conducting membrane-forming material other than the compound is illustrated by the black area in FIGS. 1 and 2, as measured using a scanning electron microscope (SEM). These areas can be measured according to the method disclosed in the examples by observing the cross-section of the anion conducting membrane with a scanning electron microscope (SEM).

The components of the anion conducting membrane-forming material other than the compound containing at least one element selected from Groups I to XVII of the periodic table mean all the components of the anion conducting membrane-forming material other than the compound containing at least one element selected from Groups I to XVII of the periodic table.

In another additional preferred embodiment of the anion conducting membrane of the invention, the particles of the compound containing at least one element selected from Groups I to XVII of the periodic table in the cross-section of the anion conducting membrane have an average cross-sectional particle size of 0.1 to 1.0 μm. With the average cross-sectional particle size of the particles falling within the above range, the membrane can have a better permeability to hydroxide ions. The average cross-sectional particle size is more preferably 0.2 to 0.7 μm, still more preferably 0.3 to 0.5 μm, particularly preferably 0.3 to 0.4 μm.

The average cross-sectional particle size of the particles of the compound containing at least one element selected from Groups I to XVII of the periodic table can be determined by the method disclosed in the examples.

Herein, the range indicated by "0.1 to 1.0 μm" includes the upper limit value and the lower limit value. That is, the range indicated by "0.1 to 1.0 μm" corresponds to the range indicated by "0.1 μm or greater and 1.0 μm or smaller".

Similarly, any range expressed by the term "to" is intended to include the upper limit value and the lower limit value of the range throughout the invention.

In another additional preferred embodiment of the anion conducting membrane of the invention, the average thickness of the anion conducting membrane is 5 μm or larger, more preferably 10 μm or larger, still more preferably 20 μm or larger, further more preferably 30 μm or larger, still further more preferably 50 μm or larger, particularly preferably 80 μm or larger. A membrane having an average thickness of less than 5 μm may be more likely to break during its formation. Thus, the properties may change as a whole, resulting in an increase in the value X. Thus, dendrite growth can be further suppressed, and the cell life can be further extended.

The upper limit of the average thickness of the membrane is not limited, and can be appropriately selected depending on the intended use of the anion conducting membrane. The average thickness of the membrane is, for example, preferably 10,000 μm or smaller, more preferably 1,000 μm or smaller, still more preferably 500 μm or smaller, particularly preferably 120 μm or smaller. Such a thin membrane has a high density, and by reducing the thickness of the membrane, the amount of the active material can be increased and thus a capacity of a cell can be sufficiently obtained. A membrane with an average thickness of larger than 10,000 μm may be disadvantageous in cost, and may have reduced permeability to hydroxide ions. Also, when the anion conducting membrane of the invention is used as a cell separator, the average thickness of the anion conducting membrane of the invention particularly preferably falls within the above-described preferred range.

When the anion conducting membrane of the invention has a multilayer structure, the average thickness of the membrane indicates the average of the combined thickness of the plural layers.

The thickness of the anion conducting membrane can be measured according to the method disclosed in the examples.

In another additional preferred embodiment of the anion conducting membrane of the invention, the anion conducting membrane has a liquid absorption rate of 25% or less. Such an anion conducting membrane prevents a short circuit between positive and negative electrodes and has better ion conductivity. The liquid absorption rate is more preferably 22% or less, still more preferably 20% or less, further more preferably 18.5% or less, particularly preferably 18% or less in terms of the amount of an aqueous electrolyte solution retained by, for example, hydrophilic functional groups and low-coalescing sites of the conjugated diene based polymer and/or the (meth)acrylic based polymer, and polymer additives.

The lower limit of the liquid absorption rate is not limited, but in another additional preferred embodiment of the anion conducting membrane of the invention, the liquid absorption rate is 1% or more. Such a membrane reliably has ion conductivity sufficient for use as a separator. The liquid absorption rate is more preferably 5% or more, and in order to further improve the life performance of the anion conducting membrane, the liquid absorption rate is further more preferably 9% or more, particularly preferably 11% or more.

At a low liquid absorption rate, the life performance of the anion conducting membrane tends to be low. This is presumably because an anion conducting membrane with a low liquid absorption rate may cause deterioration of the cell performance such as retention of the electrolyte solution and ion conductivity when used as a cell separator.

The liquid absorption rate can be calculated by the following formula:

$$\text{Liquid absorption rate (\%)} = \{(M_a - M_b)/M_b\} \times 100$$

wherein
$M_a$: mass of anion conducting membrane (g) after immersion in electrolyte solution
$M_b$: mass of anion conducting membrane (g) before immersion in electrolyte solution.

The $M_a$ and $M_b$ can be determined according to the method disclosed in the examples.

The liquid absorption rate can be controlled in the preparation of the anion conducting membrane by heating the formed membrane or changing any of the composition of the conjugated diene based polymer or the (meth)acrylic based polymer and the amount or type of an emulsifier.

The anion conducting membrane of the invention has only to have an average liquid absorption rate, which is determined from ten specimens by the method disclosed in the examples, falling within a predetermined range. Preferably, all the ten specimens have a liquid absorption rate falling within a predetermined range.

In another additional preferred embodiment of the anion conducting membrane of the invention, the anion conducting membrane has a degree of swelling of 10% or less. Such a membrane can provide an extended cell life.

The degree of swelling is more preferably 9% or lower, still more preferably 8% or lower, particularly preferably 7% or lower. Also, the degree of swelling is preferably 0.5% or higher, more preferably 1% or higher, still more preferably 1.5% or higher.

The degree of swelling can be calculated by the following formula:

$$\text{Degree of swelling } (\%) = \{(T_a - T_b)/T_b\} \times 100$$

wherein $T_a$: thickness of membrane (μm) after immersion in electrolyte solution $T_b$: thickness of membrane (μm) before immersion in electrolyte solution.

The $T_a$ and $T_b$ can be measured according to the method disclosed in the examples.

The degree of swelling can be controlled by the same method as that for controlling the liquid absorption rate.

The anion conducting membrane of the invention has only to have an average degree of swelling, which is determined from ten specimens by the method disclosed in the examples, falling within the predetermined range. Preferably, all the ten specimens have a degree of swelling falling within the predetermined range.

In another additional preferred embodiment of the anion conducting membrane of the invention, in the anion conducting membrane, a value X represented by the following equation (1) is 1000 or more:

$$X = 0.005 \times \frac{T^2 \times F \times \rho}{L} \quad (1)$$

wherein T represents the air permeance (s); F represents the piercing strength (N); ρ represents the density (g/cm³); and L represents the average membrane thickness (μm). The anion conducting membrane satisfying such a value X can suppress dendrite growth in a cell that includes an electrode active material suffering a problem of growth of dendrites such as zinc. The air permeance represented by T in the equation (1) indicates the permeability of gas, and the larger the value T, the less the membrane allows the gas to pass therethrough. The most important factor for suppressing dendrite growth is that there are no through holes through which gas can easily pass. Further, the strength and thickness of the membrane are also factors related to suppression of dendrite growth. The above equation (1) is a relational expression of the air permeance of the membrane related to suppression of dendrite growth, the piercing strength and density related to the strength of the membrane, and the thickness of the membrane. The most important factor among these, the air permeance, is weighted by squaring the air permeance.

In order to sufficiently suppress dendrite growth, the value X is more preferably 2,500 or more, still more preferably 5,000 or more, particularly preferably 7,000 or more. Also, the value X is, for example, preferably 230,000 or less, more preferably 220,000 or less, still more preferably 200,000 or less. The upper limit of the value X is not limited as long as the membrane allows ions involved in cell reaction to pass therethrough. In order to achieve the effects of the invention better even when similar membrane materials are used, it is particularly preferred that there is no upper limit to the value X.

In another additional preferred embodiment of the anion conducting membrane of the invention, the numerical range of the average thickness L of the membrane is the same as the preferred numerical range of the above average thickness of the membrane.

In another additional preferred embodiment of the anion conducting membrane of the invention, the air permeance T is 600 s or higher. The air permeance T is more preferably 800 s or higher, still more preferably 1,100 s or higher, further more preferably 4,000 s or higher, still further more preferably 5,500 s or higher, particularly preferably 8,000 s or higher.

The upper limit of the air permeance T is not limited as long as the membrane allows ions involved in cell reaction to pass therethrough. In order to achieve the effects of the invention better when similar membrane materials are used, it is more preferred that there is no upper limit to the air permeance T. When there is no upper limit to the air permeance T, there is also no upper limit to the value X.

The air permeance T is measured by the method in the examples below.

In another additional preferred embodiment of the anion conducting membrane of the invention, the piercing strength F is 0.1 N or more. The piercing strength F is more preferably 0.3 N or more, still more preferably 0.7 N or more, particularly preferably 1.5 N or more.

The upper limit of the piercing strength F is not limited, and the piercing strength F is preferably 10 N or less, more preferably 7 N or less, still more preferably 5 N or less.

The piercing strength F is measured by the method in the examples below.

In another additional preferred embodiment of the anion conducting membrane of the invention, the density ρ is 0.1 g/cm³ or more. The density ρ is more preferably 0.3 g/cm³ or more, still more preferably 0.5 g/cm³ or more, particularly preferably 1.5 g/cm³ or more.

The upper limit of the density ρ is not limited, and the density ρ is preferably 10 g/cm³ or less, more preferably 5 g/cm³ or less, still more preferably 3 g/cm³ or less.

The density ρ is measured by the method in the examples below.

In another additional preferred embodiment of the anion conducting membrane of the invention, the anion conducting membrane has a multilayer structure. Such an anion conducting membrane having a multilayer structure of the invention has a high air permeance and a high piercing strength even if the membrane has through holes because the positions of the through holes are different between the layers. Thus, the value X increases, and the effect of suppressing dendrite growth is enhanced.

The anion conducting membrane of the invention more preferably has a multilayer structure consisting of three or more layers, still more preferably has a multilayer structure consisting of four or more layers.

In another additional preferred embodiment of the anion conducting membrane of the invention, the membrane has a resistance value R of 0.01Ω or more. The resistance value R is more preferably 0.02Ω or more, still more preferably 0.03Ω or more, further more preferably 0.05Ω or more, particularly preferably 0.1Ω or more.

The anion conducting membrane of the invention preferably has a resistance value R of 1.0Ω or less. The resistance value R is more preferably 0.5Ω or less, still more preferably 0.3Ω or less, particularly preferably 0.25Ω or less.

The anion conducting membrane having a resistance value R falling within the above range can provide a cell with high energy efficiency when used as a cell component such as a separator, an electrolyte, or an electrode protection membrane.

The resistance value R can be measured according to the method disclosed in the examples.

It is preferred that the anion conducting membrane of the invention is formed from an anion conducting membrane-forming material including a conjugated diene based polymer and/or a (meth)acrylic based polymer and a compound containing at least one element selected from Groups I to XVII of the periodic table, and has a ratio of the combined area of particles of the compound containing at least one element selected from Groups I to XVII of the periodic table to the combined area of the components of the anion conducting membrane-forming material other than the compound (particles of the compound/components of the anion conducting membrane-forming material other than the compound) of 70/30 to 30/70; and the particles of the compound containing at least one element selected from Groups I to XVII of the periodic table have an average cross-sectional particle size of 0.1 to 1.0 μm in a cross-section of the anion conducting membrane. Thus, the anion conducting membrane of the invention can achieve the effects of the invention of allowing hydroxide ions to selectively pass therethrough and effectively suppressing dendrite growth, and can exhibit better hydroxide ion conductivity.

It is also preferred that the anion conducting membrane of the invention is formed from an anion conducting membrane-forming material including a conjugated diene based polymer and/or a (meth)acrylic based polymer and a compound containing at least one element selected from Groups I to XVII of the periodic table, and has a ratio of the combined area of particles of the compound containing at least one element selected from Groups I to XVII of the periodic table to the combined area of the components of the anion conducting membrane-forming material other than the compound (particles of the compound/components of the anion conducting membrane-forming material other than the compound) of 70/30 to 30/70; and the membrane has a liquid absorption rate of 1% to 25%. Thus, the anion conducting membrane of the invention can achieve the above-described effects of the invention, reliably have sufficient ion conductivity, and suppress the amount of retention of the aqueous electrolyte solution, thereby preventing a short circuit between positive and negative electrodes.

It is preferred that the anion conducting membrane of the invention is formed from an anion conducting membrane-forming material including a conjugated diene based polymer and/or a (meth)acrylic based polymer and a compound containing at least one element selected from Groups I to XVII of the periodic table, and has a ratio of the combined area of particles of the compound containing at least one element selected from Groups I to XVII of the periodic table to the combined area of the components of the anion conducting membrane-forming material other than the compound (particles of the compound/components of the anion conducting membrane-forming material other than the compound) of 70/30 to 30/70; and the membrane has a degree of swelling of 10% or less. Thus, the anion conducting membrane achieves the above-described effects of the invention, and can prevent a short circuit between positive and negative electrodes to provide a long-life cell including the anion conducting membrane. In this case, in order to reliably obtain more sufficient ion conductivity, the degree of swelling is preferably 0.5% or more.

It is preferred that the anion conducting membrane of the invention is formed from an anion conducting membrane-forming material including a conjugated diene based polymer and/or a (meth)acrylic based polymer and a compound containing at least one element selected from Groups I to XVII of the periodic table, and has a ratio of the combined area of particles of the compound containing at least one element selected from Groups I to XVII of the periodic table to the combined area of the components of the anion conducting membrane-forming material other than the compound (particles of the compound/components of the anion conducting membrane-forming material other than the compound) of 70/30 to 30/70; and the value X determined from the equation (1) described in the examples is 1,000 or more. Thus, the above-described effects of the invention can be achieved, and dendrite growth can be further suppressed. In this case, in order to more sufficiently suppress dendrite growth, the value X is more preferably 2,500 or more, still more preferably 5,000 or more, particularly preferably 7,000 or more. Further, the value X is preferably 230,000 or less.

It is preferred that the anion conducting membrane of the invention is formed from an anion conducting membrane-forming material including a conjugated diene based polymer and/or a (meth)acrylic based polymer and a compound containing at least one element selected from Groups I to XVII of the periodic table, and has a ratio of the combined area of particles of the compound containing at least one element selected from Groups I to XVII of the periodic table to the combined area of the components of the anion conducting membrane-forming material other than the compound (particles of the compound/components of the anion conducting membrane-forming material other than the compound) of 70/30 to 30/70; and the membrane has a resistance R of 0.01Ω or more and 1.0Ω or less. Thus, the anion conducting membrane can achieve the above-described effects of the invention and can provide a cell with high energy efficiency when used as a cell component such as a separator, an electrolyte, or an electrode protection membrane.

In another additional preferred embodiment of the anion conducting membrane of the invention, the conjugated diene based polymer and the (meth)acrylic based polymer of the anion conducting membrane-forming material each have a weight average molecular weight of 200 to 7,000,000. With such a weight average molecular weight, the ion conductivity, flexibility, and other properties of the anion conducting membrane can be controlled. The weight average molecular weight is more preferably 400 or more, still more preferably 500 or more, further preferably 10,000 or more, further more preferably 20,000 or more, particularly preferably 100,000 or more.

The weight average molecular weight of each polymer is more preferably 6,500,000 or less, still more preferably 5,000,000 or less, particularly preferably 1,000,000 or less.

The weight average molecular weight can be determined by gel permeation chromatography (GPC) relative to polystyrene standards.
Apparatus: HCL-8220GPC produced by Tosoh Corporation
Column: TSKgel Super AWM-H
Eluent (LiBr.H$_2$O, NMP containing phosphoric acid): 0.01 mol/L In another additional preferred embodiment of the anion conducting membrane of the invention, the conjugated diene based polymer and the (meth)acrylic based polymer each have a glass transition temperature (Tg) of −20° C. to 50° C.

When the Tg of the conjugated diene based polymer and (meth)acrylic based polymer is −20° C. or higher, the anion conducting membrane can have sufficient strength and sufficiently suppresses dendrites. In addition, when the Tg is 50° C. or lower, the anion conducting membrane may not become too rigid or brittle. Thus, this can prevent deterioration of the cell life performance due to deterioration of the forming properties of the membrane and cracking of the membrane in the production of a cell. When the anion conducting membrane of the invention contains at least one compound selected from the group consisting of oxides, hydroxides, and layered double hydroxides, voids may possibly be formed in the anion conducting membrane due to aggregation of the particles of the at least one inorganic compound selected from the group consisting of oxides, hydroxides, and layered double hydroxides. In order to suppress the formation of the voids, it is preferred that the components of the anion conducting membrane-forming material are sufficiently kneaded to uniformly mix the particles of the compound and the components other than the particles of the compound without aggregation of the particles of the compound. When the Tg of the conjugated diene based polymer and the (meth)acrylic based polymer is −20° C. or higher and 50° C. or lower, these polymers and the particles of the compound are kneaded with appropriate fluidity, thereby achieving disintegration of aggregates of the particles of the compound and providing a more uniform mixture of the components of the anion conducting membrane-forming material. The Tg of the conjugated diene based polymer and the (meth)acrylic based polymer is more preferably −15° C. or higher and 30° C. or lower, still more preferably −10° C. or higher and 20° C. or lower, further preferably −10° C. or higher and 10° C. or lower, particularly preferably −10° C. or higher and 5° C. or lower.

The Tg of the polymer can be measured according to the method disclosed in the examples using a differential scanning calorimeter.

In another additional preferred embodiment of the anion conducting membrane of the invention, the proportion by mass of the conjugated diene based polymer and/or the (meth)acrylic based polymer is 0.1% by mass or more per 100% by mass of the anion conducting membrane-forming material in terms of the strength and ion conductivity of the anion conducting membrane. The proportion by mass is more preferably 1% by mass or more, still more preferably 10% by mass or more, further preferably 15% by mass or more, further more preferably 20% by mass or more, still further more preferably 25% by mass or more, particularly preferably 30% by mass or more. The proportion by mass is preferably 99.9% by mass or less, more preferably 99% by mass or less, still more preferably 90% by mass or less, further preferably 80% by mass or less, further more preferably 70% by mass or less, still further more preferably 60% by mass or less, particularly preferably 50% by mass or less, most preferably 40% by mass or less.

The aforementioned preferred proportion by mass of the conjugated diene based polymer and/or the (meth)acrylic based polymer in the anion conducting membrane-forming material shall apply to the preferred proportion by mass of the conjugated diene based polymer and/or the (meth)acrylic based polymer in the anion conducting membrane.

The term "proportion of the conjugated diene based polymer and/or the (meth)acrylic based polymer" herein means, when the anion conducting membrane-forming material contains either the conjugated diene based polymer or the (meth)acrylic based polymer, the proportion of the polymer contained, and means, when the anion conducting membrane-forming material contains both the conjugated diene based polymer and the (meth)acrylic based polymer, the combined proportion of both the polymers.

The following describes the conjugated diene based polymer and the (meth)acrylic based polymer as other preferred embodiments of the above embodiments of the anion conducting membrane of the invention. Subsequently describes the compound containing at least one element selected from Groups I to XVII of the periodic table, an additional component, and a method for producing the anion conducting membrane.

<Conjugated Diene Based Polymer>

The conjugated diene based polymer may be any one containing a monomer unit derived from a conjugated diene monomer. The conjugated diene based polymer preferably further contains a monomer unit derived from an aromatic vinyl monomer. The liquid absorption rate, air permeance, piercing strength, and density of the anion conducting membrane of the invention are suitably controlled by using the conjugated diene based polymer having the below-described composition. Such a conjugated diene based polymer is prepared by, for example, introducing a functional group or a monomer unit derived from different unsaturated monomer containing, for example, an acid group, or using a known emulsifier.

The conjugated diene monomer is preferably an aliphatic conjugated diene monomer. Examples of the aliphatic conjugated diene monomer include 1,3-butadiene, isoprene, 2-chloro-1,3-butadiene, and chloroprene. Preferred is 1,3-butadiene. A conjugated diene monomer may be used alone, or two or more of conjugated diene monomers may be used in combination.

The conjugated diene based polymer may contain a functional group such as an ester group, a hydroxy group, or a carboxy group. The conjugated diene based polymer containing such a functional group has high affinity with the particles of the inorganic compound, resulting in enhancement of the uniformity of the material.

The conjugated diene based polymer may include one or two or more of, for example, homopolymers such as polybutadiene and polyisoprene and copolymers. For example, the conjugated diene based polymer is preferably a copolymer further containing a monomer unit derived from an aromatic vinyl monomer.

Examples of the aromatic vinyl monomer include styrene, α-methylstyrene, o-methylstyrene, m-methylstyrene, p-methylstyrene, o-ethylstyrene, m-ethylstyrene, p-ethylstyrene, o-methoxystyrene, m-methoxystyrene, p-methoxystyrene, o-ethoxystyrene, m-ethoxystyrene, p-ethoxystyrene, o-fluorostyrene, m-fluorostyrene, p-fluorostyrene, o-chlorostyrene, m-chlorostyrene, p-chlorostyrene, o-bromostyrene, m-bromostyrene, p-bromostyrene, o-acetoxystyrene, m-acetoxystyrene, p-acetoxystyrene, o-tert-butoxystyrene, m-tert-butoxystyrene, p-tert-butoxystyrene, o-tert-butylstyrene, m-tert-butylstyrene, p-tert-butylstyrene, and vinyl toluene. Preferred among these are styrene and α-methylstyrene because they can enhance the heat resistance and the mechanical strength of the anion conducting membrane. Each of these aromatic vinyl monomers may be used alone, or two or more of these may be used in combination.

The mass ratio of the monomer unit derived from an aliphatic conjugated diene monomer to the monomer unit derived from an aromatic vinyl monomer in the conjugated diene based polymer is, for example, preferably 1/9 or more and 9/1 or less, more preferably 2/8 or more and 8/2 or less, still more preferably 3/7 or more and 7/3 or less.

The conjugated diene based polymer may contain a monomer unit derived from different unsaturated monomer other than the monomer unit derived from an aliphatic conjugated diene monomer and the monomer unit derived from an aromatic vinyl monomer.

Examples of the different unsaturated monomer include acid group-containing vinyl monomers such as itaconic acid, acrylic acid, methacrylic acid, fumaric acid, maleic acid, acrylamide methylpropanesulfonic acid, and styrenesulfonic acid salts; (meth)acrylic acid alkyl ester monomers such as methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, and decyl (meth)acrylate; hydroxy group-containing vinyl monomers such as 2-hydroxyethyl (meth)acrylate and 4-hydroxybutyl (meth)acrylate; nitrile group-containing vinyl monomers such as (meth)acrylonitrile; (meth)acrylamide monomers such as (meth)acrylamide, N-methylol (meth)acrylamide, N-ethylol (meth)acrylamide, dimethyl (meth)acrylamide, and diethyl (meth)acrylamide; bifunctional vinyl monomers such as divinylbenzene, ethylene glycol dimethacrylate, isopropylene glycol diacrylate, and tetramethylene glycol dimethacrylate; and alkoxysilane group-containing vinyl monomers such as 3-methacryloxypropylmethyldimethoxysilane, 3-methacryloxypropyltrimethoxysilane, and 3-methacryloxypropyltriethoxysilane.

The conjugated diene based polymer containing a highly polar functional group such as an ester group, a hydroxy group, or a carboxy group can have enhanced affinity with the particles of the inorganic compound to increase the dispersibility of the particles, resulting in enhancement of the uniformity of the material.

The proportion by mass of the monomer unit derived from the different unsaturated monomer is preferably 40% by mass or less, more preferably 20% by mass or less, still more preferably 10% by mass or less, particularly preferably 5% by mass or less in 100% by mass of the conjugated diene based polymer.

When the conjugated diene based polymer contains a monomer unit derived from a (meth)acrylic acid alkyl ester monomer as the monomer unit derived from the different unsaturated monomer, the proportion by mass of the monomer unit derived from a (meth)acrylic acid alkyl ester monomer is smaller than the proportion by mass of the monomer unit derived from a conjugated diene monomer in the conjugated diene based polymer.

In terms of membrane-forming properties, the conjugated diene based polymer may preferably include one or two or more of styrene-butadiene based copolymers, polybutadiene, polyisoprene, acrylonitrile-butadiene based copolymers, and isobutylene-isoprene based copolymers. Preferred among these are styrene-butadiene based copolymers and acrylonitrile-butadiene based copolymers, and particularly preferred are styrene-butadiene based copolymers, in terms of uniform presence of the inorganic compound in the anion conducting membrane and the mechanical strength of the anion conducting membrane.

<(Meth)Acrylic Based Polymer>

The (meth)acrylic based polymer in the invention contains a monomer unit derived from a (meth)acrylic acid alkyl ester monomer as a major constituent. The phrase "contains a monomer unit derived from a (meth)acrylic acid alkyl ester monomer as a major constituent" means that, in the (meth) acrylic based polymer, the proportion by mass of the monomer unit derived from a (meth)acrylic acid alkyl ester monomer is larger than any of the proportions by mass of monomer units derived from the below-described different unsaturated monomers.

Preferred examples of the (meth)acrylic acid alkyl ester monomer include C1-C12 alkyl group-containing (meth)acrylic acid alkyl ester monomers such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, sec-butyl (meth)acrylate, amyl (meth)acrylate, cyclohexyl (meth)acrylate, heptyl (meth)acrylate, 2-ethylhexyl (meth)acrylate, n-octyl (meth)acrylate, isooctyl (meth)acrylate, nonyl (meth)acrylate, isononyl (meth)acrylate, decyl (meth)acrylate, and dodecyl (meth)acrylate. One or more of these may be used.

For example, in another additional preferred embodiment of the anion conducting membrane of the invention, the (meth)acrylic based polymer contains as a major constituent a monomer unit derived from a C1-C12 alkyl group-containing (meth)acrylic acid alkyl ester monomer. The phrase "contains as a major constituent a monomer unit derived from a C1-C12 alkyl group-containing (meth)acrylic acid alkyl ester monomer" means that, in the (meth)acrylic based polymer, the proportion by mass of the monomer unit derived from a C1-C12 alkyl group-containing (meth)acrylic acid alkyl ester monomer is larger than the proportion by mass of a monomer unit derived from any of the below-described different unsaturated monomers and the proportion by mass of a monomer unit derived from a (meth)acrylic acid alkyl ester monomer whose alkyl group has 13 or more carbon atoms.

The (meth)acrylic based polymer may consist only of the monomer unit derived from a (meth)acrylic acid alkyl ester monomer, or may optionally contain a monomer unit derived from any of the different unsaturated monomers. In this case, in terms of cell life extension, the proportion by mass of the monomer unit derived from a (meth)acrylic acid alkyl ester monomer is preferably 50% by mass or more of all the monomer units of the (meth)acrylic based polymer. The proportion by mass of the monomer unit is more preferably 60% by mass or more, still more preferably 70% by mass or more. The upper limit of the proportion by mass of the monomer unit is not limited and is 100% by mass. In order to enhance the mechanical strength of the membrane, the proportion by mass is, for example, preferably 99% by mass or less, more preferably 98% by mass or less, still more preferably 95% by mass or less.

Examples of the different unsaturated monomer include, but are not limited to in the invention, monofunctional monomers and polyfunctional monomers, such as carboxy group-containing monomers, hydroxy group-containing (meth)acrylic acid ester compounds, oxo group-containing monomers, nitrogen-containing monomers, fluorine-containing monomers, epoxy group-containing monomers, carbonyl group-containing monomers, aziridinyl group-containing monomers, styrene-based monomers, and aralkyl (meth)acrylic acid ester compounds. Each of these unsaturated monomers may be used alone, or two or more of these may be used in combination.

Examples of the carboxy group-containing monomers include, but are not limited to in the invention, carboxy group-containing aliphatic monomers such as (meth)acrylic acid, maleic acid, fumaric acid, crotonic acid, itaconic acid, citraconic acid, maleic anhydride, maleic acid monomethyl ester, maleic acid monobutyl ester, itaconic acid monomethyl ester, itaconic acid monobutyl ester, and vinylbenzoic acid. Each of these carboxy group-containing monomers may be used alone, or two or more of these may be used in combination. Preferred among these carboxy group-containing monomers are acrylic acid, methacrylic acid, maleic acid, fumaric acid, and itaconic acid, and more preferred are acrylic acid, methacrylic acid, and itaconic acid, in order to enhance the mechanical strength of the membrane. The carboxy group may be in the form of a salt such as a metal (e.g. alkali metal) salt or an ammonium salt.

Examples of the hydroxy group-containing (meth)acrylic acid ester compounds include, but are not limited to in the invention, hydroxy group-containing (meth)acrylic acid ester compounds containing a C1-C18 ester group, such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate. Each of these hydroxy group-containing (meth)acrylic acid ester compounds may be used alone, or two or more of these may be used in combination.

Examples of the oxo group-containing monomers include, but are not limited to in the invention, (di)ethylene glycol (methoxy)(meth)acrylates such as ethylene glycol (meth)acrylate, ethylene glycol methoxy(meth)acrylate, diethylene glycol (meth)acrylate, and diethylene glycol methoxy(meth)acrylate. Each of these oxo group-containing monomers may be used alone, or two or more of these may be used in combination.

Examples of the fluorine-containing monomers include, but are not limited to in the invention, fluorine-containing alkyl (meth)acrylates containing a C2-C6 ester group, such as trifluoroethyl (meth)acrylate, tetrafluoropropyl (meth)acrylate, and octafluoropentyl (meth)acrylate. Each of these fluorine-containing monomers may be used alone, or two or more of these may be used in combination.

Examples of the nitrogen-containing monomers include, but are not limited to in the invention, acrylamide compounds such as (meth)acrylamide, N-monomethyl (meth)acrylamide, N-monoethyl (meth)acrylamide, N,N-dimethyl (meth)acrylamide, N-n-propyl (meth)acrylamide, N-isopropyl (meth)acrylamide, methylenebis(meth)acrylamide, N-methylol (meth)acrylamide, N-butoxymethyl (meth)acrylamide, dimethylaminoethyl (meth)acrylamide, N,N-dimethylaminopropyl acrylamide, and diacetone acrylamide; nitrogen-containing (meth)acrylic acid ester compounds such as dimethylaminoethyl (meth)acrylate and diethylaminoethyl (meth)acrylate; N-vinyl pyrrolidone; and (meth)acrylonitrile. Each of these nitrogen-containing monomers may be used alone, or two or more of these may be used in combination.

Examples of the epoxy group-containing monomers include, but are not limited to in the invention, epoxy group-containing (meth)acrylates such as glycidyl (meth)acrylate, α-methylglycidyl (meth)acrylate, and glycidyl allyl ether. Each of these epoxy group-containing monomers may be used alone, or two or more of these may be used in combination.

Examples of the carbonyl group-containing monomers include, but are not limited to in the invention, acrolein, formylstyrol, vinyl ethyl ketone, (meth)acrylic oxyalkyl propenal, acetonyl (meth)acrylate, diacetone (meth)acrylate, 2-hydroxypropyl (meth)acrylate acetyl acetate, butanediol-1,4-acrylate acetyl acetate, and 2-(acetoacetoxy)ethyl (meth)acrylate. Each of these carbonyl group-containing monomers may be used alone, or two or more of these may be used in combination.

Examples of the aziridinyl group-containing monomers include, but are not limited to in the invention, (meth)acryloyl aziridine and 2-aziridinylethyl (meth)acrylate. Each of these aziridinyl group-containing monomers may be used alone, or two or more of these may be used in combination.

Examples of the styrene-based monomers include, but are not limited to in the invention, styrene, α-methylstyrene, p-methylstyrene, tert-methylstyrene, chlorostyrene, and vinyl toluene. Each of these styrene-based monomers may be used alone, or two or more of these may be used in combination. The styrene-based monomers may contain a functional group attached to a benzene ring, such as an alkyl group (e.g. a methyl group, a tert-butyl group), a nitro group, a nitrile group, an alkoxyl group, an acyl group, a sulfone group, a hydroxyl group, or a halogen atom. Among these styrene-based monomers, styrene is preferred in order to increase the mechanical strength of the membrane.

Examples of the (meth)acrylic acid aralkyl ester compounds include, but are not limited to in the invention, C7-C18 aralkyl group-containing (meth)acrylic acid aralkyl ester compounds such as benzyl (meth)acrylate, phenylethyl (meth)acrylate, methylbenzyl (meth)acrylate, and naphthylmethyl (meth)acrylate. Each of these (meth)acrylic acid aralkyl ester compounds may be used alone, or two or more of these may be used in combination.

Examples of preferred monofunctional monomers among the above monomers include carboxy group-containing monomers, hydroxy group-containing (meth)acrylic acid ester compounds, oxo group-containing monomers, fluorine-containing monomers, nitrogen-containing monomers, epoxy group-containing monomers, and styrene-based monomers. Each of these monomers may be used alone, or two or more of these may be used in combination.

Examples of the polyfunctional monomers include, but are not limited to in the invention, di(meth)acrylates of C1-C10 polyhydric alcohols, such as ethylene glycol di(meth)acrylate, propylene glycol di(meth)acrylate, 1,3-butanediol di(meth)acrylate, 1,4-butanediol di(meth)acrylate, 1,6-hexanediol di(meth)acrylate, ethylene oxide-modified 1,6-hexanediol di(meth)acrylate, 1,9-nonanediol di(meth)acrylate, propylene oxide-modified neopentyl glycol di(meth)acrylate, and tripropylene glycol di(meth)acrylate; alkyl di(meth)acrylates with 2 to 50 moles of a C2-C4 alkylene oxide group added thereto, such as polyethylene glycol di(meth)acrylate with 2 to 50 moles of ethylene oxide added thereto, polypropylene glycol di(meth)acrylate with 2 to 50 moles of propylene oxide added thereto, and tripropylene glycol di(meth)acrylate; tri(meth)acrylates of C1-C10 polyhydric alcohols, such as ethoxylated glycerin tri(meth)acrylate, propylene oxide-modified glycerol tri(meth)acrylate, ethylene oxide-modified trimethyrolpropane tri(meth)acrylate, trimethyrolpropane tri(meth)acrylate, pentaerythritol monohydroxy tri(meth)acrylate, and trimethylolpropane triethoxy tri(meth)acrylate; tetra(meth)acrylates of C1-C10 polyhydric alcohols, such as pentaerythritol tetra(meth)acrylate, dipentaerythritol tetra(meth)acrylate, and ditrimethylolpropane tetra(meth)acrylate; penta(meth)acrylates of C1-C10 polyhydric alcohols, such as pentaerythritol penta(meth)acrylate and dipentaerythritol (monohydroxy) penta(meth)acrylate; hexa(meth)acrylates of C1-C10 polyhydric alcohols such as pentaerythritol hexa (meth)acrylate; epoxy group-containing (meth)acrylates such as bisphenol A di(meth)acrylate, 2-(2'-vinyloxyethoxyethyl) (meth)acrylate, and epoxy (meth)acrylate; and polyfunctional (meth)acrylates such as urethane (meth)acrylate. Each of these polyfunctional monomers may be used alone, or two or more of these may be used in combination.

The proportion by mass of the monomer unit derived from the different unsaturated monomer in the (meth)acrylic based polymer is preferably 50% by mass or less, more preferably 40% by mass or less, still more preferably 30% by mass or less in 100% by mass of all the monomer units of the (meth)acrylic based polymer. The lower limit of the proportion by mass of the monomer unit derived from the different unsaturated monomer is not limited and is 0% by mass. The proportion by mass is preferably 0.1% by mass or more.

When the (meth)acrylic based polymer contains a monomer unit derived from a carboxy group-containing monomer as the monomer unit derived from the different unsaturated monomer, the proportion by mass of the monomer unit derived from a carboxy group-containing monomer is preferably 0.5% by mass or more in 100% by mass of all the monomer units of the (meth)acrylic based polymer in order to prepare a long-life cell. The proportion by mass is more preferably 1% by mass or more, still more preferably 2% by mass or more.

The proportion by mass of the monomer unit derived from a carboxy group-containing monomer is preferably 8% by mass or less, more preferably 4% by mass or less in 100% by mass of all the monomer units of the (meth)acrylic based polymer.

When the (meth)acrylic based polymer contains a monomer unit derived from a styrene-based monomer as the monomer unit derived from the different unsaturated monomer, the proportion by mass of the monomer unit derived from a styrene-based monomer is preferably 1% by mass or more, more preferably 5% by mass or more, still more preferably 10% by mass or more in 100% by mass of all the monomer units of the (meth)acrylic based polymer. The proportion by mass of the monomer unit derived from a styrene-based monomer is preferably 45% by mass or less, more preferably 35% by mass or less, still more preferably 25% by mass or less in 100% by mass of all the monomer units of the (meth)acrylic based polymer.

When the (meth)acrylic based polymer contains a monomer unit derived from a polyfunctional monomer as the monomer unit derived from the different unsaturated monomer, the proportion by mass of the monomer unit derived from a polyfunctional monomer is preferably 0.1% by mass or more, more preferably 0.2% by mass or more, still more preferably 0.5% by mass or more in 100% by mass of all the monomer units of the (meth)acrylic based polymer. The proportion by mass of the monomer unit derived from a polyfunctional monomer is preferably 5% by mass or less, more preferably 3% by mass or less in 100% by mass of all the monomer units of the (meth)acrylic based polymer.

The conjugated diene based polymer and the (meth)acrylic based polymer may be each produced by polymerization of a monomer component that forms a constituent unit of the polymer.

A monomer component may be polymerized by any polymerization method such as aqueous solution polymerization, emulsion polymerization, inverse suspension polymerization, suspension polymerization, solution polymerization, or bulk polymerization. Preferred among these methods is emulsion polymerization that allows simple production. When a monomer component is polymerized by emulsion polymerization, the monomer component, a surfactant, and a dispersion medium containing water as a major constituent may be mixed before emulsion polymerization, the monomer component, a surfactant, and an aqueous medium may be stir-emulsified into a pre-emulsion before emulsion polymerization, or at least one of the monomer component, a surfactant, and a medium and a pre-emulsion of the rest of these components may be mixed before emulsion polymerization. Each of the monomer component, the surfactant, and the medium may be added in one portion or in several portions, or may be continuously added dropwise.

Examples of the surfactant include anionic surfactants, nonionic surfactants, cationic surfactants, and amphoteric surfactants. One or two or more of these surfactants may be used.

Examples of the anionic surfactants include, but are not limited to, alkyl sulfate salts such as ammonium dodecyl sulfate and sodium dodecyl sulfate; alkyl sulfonate salts such as ammonium dodecyl sulfonate, sodium dodecyl sulfonate, and sodium alkyl diphenyl ether disulfonate; alkylarylsulfonate salts such as sodium dodecylbenzenesulfonate, ammonium dodecylbenzenesulfonate, and sodium dodecylnaphthalenesulfonate; polyoxyethylene alkyl phenyl ether sulfuric acid ester salts; polyoxyethylene alkyl sulfonate salts; polyoxyethylene alkyl sulfate salts; polyoxyethylene alkyl aryl sulfate salts; dialkyl sulfosuccinic acid salts; aryl sulfonic acid-formalin condensates; fatty acid salts such as ammonium laurate and sodium stearate; allyl group-containing sulfuric acid esters or salts thereof such as bis(polyoxyethylene polycyclic phenylether)methacrylate sulfonate salts, propenyl-alkyl sulfosuccinic acid ester salts, (meth)acrylic acid polyoxyethylene sulfonate salts, (meth)acrylic acid polyoxyethylene phosphonate salts, and allyloxymethyl alkyl oxypolyoxyethylene sulfonate salts; and allyloxymethyl alkoxy ethyl polyoxyethylene sulfuric acid ester salts.

Examples of the nonionic surfactants include, but are not limited to, polyoxyethylene alkyl ethers, polyoxyethylene alkyl aryl ethers, condensates of polyethylene glycol and polypropylene glycol, sorbitan fatty acid esters, polyoxyethylene sorbitan fatty acid esters, fatty acid monoglycerides, condensates of ethylene oxide and an aliphatic amine, allyloxymethyl alkoxy ethyl hydroxy polyoxyethylene, and polyoxyalkylene alkenyl ether. Examples of the cationic surfactants include, but are not limited to, alkyl ammonium salts such as dodecyl ammonium chloride. Examples of the amphoteric surfactants include, but are not limited to, betaine ester type surfactants.

In order to enhance polymerization stability, the amount of the surfactant used in the emulsion polymerization is preferably 0.01% by mass or more, more preferably 0.1% by mass or more, still more preferably 0.2% by mass or more, further more preferably 0.5% by mass or more, particularly preferably 1% by mass or more per 100% by mass of all the monomer components for preparing the conjugated diene based polymer or the (meth)acrylic based polymer. Also, in order to extend the cell life, the amount of the surfactant is preferably 10% by mass or less, more preferably 7% by mass or less, still more preferably 5% by mass or less.

A polymerization initiator may be used in the polymerization of a monomer component. The polymerization initiator may be any one commonly used that generates a radical molecule by heat. Examples of the polymerization initiator include persulfuric acid salts such as potassium persulfate, ammonium persulfate, and sodium persulfate; water-soluble azo compounds such as 2,2'-azobis[N-(2-carboxyethyl)-2-methylpropionamidine], 2,2'-azobis(2-amidinopropane)dihydrochloric acid salts, and 4,4'-azobis(4-cyanopentanoic acid); thermal decomposition initiators such as hydrogen peroxide; redox initiators such as a combination of hydrogen peroxide and ascorbic acid, a combination of t-butyl hydroperoxide and rongalite, a combination of potassium persulfate and a metal salt, and a combination of ammonium persulfate and sodium hydrogen sulfite. One or two or more of these may be used.

The amount of the polymerization initiator used is preferably 0.02% by mass or more and 2% by mass or less, more preferably 0.05% by mass or more and 1% by mass or less per 100% by mass of the total amount of the monomer components used in the polymerization reaction.

The conjugated diene based polymer and the (meth)acrylic based polymer may be produced at any polymerization temperature that allows the polymerization reaction to proceed. The temperature is preferably 20° C. or higher and 100° C. or lower, more preferably 40° C. or higher and 90° C. or lower. Also, the polymerization reaction time is not limited, and in light of productivity, the polymerization reaction time is preferably 0.5 hours or more and 10 hours or less, more preferably 1 hour or more and 5 hours or less.

When the monomer component is emulsion polymerized using water as a medium, the conjugated diene based polymer and/or the (meth)acrylic based polymer are/is obtained in the form of latex particles in an aqueous dispersion, and have/has a volume average particle size of preferably 20 nm or greater, more preferably 50 nm or greater, still more preferably 80 nm or greater in order to form a uniform membrane, and is preferably 5000 nm or less, more preferably 1000 nm or less, still more preferably 500 nm or less in order to suppress permeation of water and ions into binding material sites in the membrane.

The volume average particle size may be measured as follows: an aqueous dispersion of each of the conjugated diene based polymer and the (meth)acrylic based polymer is diluted with distilled water, and about 10 mL of the dilution is put into a glass cell and subjected to dynamic light scattering using a particle size distribution analyzer (NICOMP Model 380 produced by Particle Sizing Systems).

<Compound Containing at Least One Element Selected from Groups I to XVII of the Periodic Table>

The anion conducting membrane of the invention contains a compound containing at least one element selected from Groups I to XVII of the periodic table.

The at least one element selected from Groups I to XVII of the periodic table is preferably at least one element selected from the group consisting of alkali metals, alkaline-earth metals, Mg, Sc, Y, lanthanoid, Ti, Zr, Hf, V, Nb, Ta, Cr, Mo, W, Mn, Fe, Ru, Co, Ni, Pd, Cu, Ag, Au, Zn, Cd, B, Al, Ga, In, Tl, C, Si, Ge, Sn, Pb, N, P, Sb, Bi, S, Se, Te, F, Cl, and Br. Preferred among these is at least one element selected from Groups I to XV of the periodic table. More preferred is at least one element selected from the group consisting of Li, Na, K, Cs, Mg, Ca, Ba, Sc, Y, lanthanoid, Ti, Zr, Nb, Cr, Mn, Fe, Ru, Co, Ni, Pd, Cu, Ag, Au, Zn, Cd, B, Al, Ga, In, Tl, C, Si, Ge, Sn, Pb, N, P, Sb, and, Bi. Still more preferred is at least one element selected from the group consisting of Li, Mg, Ca, Ba, Sc, Y, lanthanoid, Ti, Zr, Nb, Cr, Mn, Fe, Ru, Co, Ni, Pd, Cu, Zn, Cd, B, Al, Ga, In, and Tl.

Examples of the compound containing at least one element selected from Groups I to XVII of the periodic table include oxides, composite oxides, layered double hydroxides, hydroxides, clay compounds, solid solutions, alloys, zeolite, halides, carboxylate compounds, carbonate compounds, hydrocarbon compounds, nitric acid compounds, sulfuric acid compounds, sulfonic acid compounds, phosphoric acid compounds such as hydroxyapatite, phosphorous acid compounds, hypophosphorous acid compounds, boric acid compounds, silicic acid compounds, aluminic acid compounds, sulfides, onium compounds, and salts. Preferred examples are oxides, composite oxides, layered double hydroxides such as hydrotalcite, hydroxides, clay compounds, solid solutions, zeolite, fluorides, phosphoric acid compounds, boric acid compounds, silicic acid compounds; aluminic acid compounds, and salts.

Preferred among the compounds containing at least one element selected from Groups I to XVII of the periodic table is at least one compound selected from the group consisting of oxides, hydroxides, layered double hydroxides, and phosphoric acid compounds.

The oxides preferably include at least one compound selected from the group consisting of lithium oxide, sodium oxide, potassium oxide, calcium oxide, barium oxide, scandium oxide, yttrium oxide, lanthanoid oxide, zirconium oxide, niobium oxide, ruthenium oxide, nickel oxide, palladium oxide, copper oxide, cadmium oxide, boron oxide, gallium oxide, indium oxide, thallium oxide, silicon oxide, germanium oxide, tin oxide, lead oxide, phosphorus oxide, and bismuth oxide. The oxide is preferably, for example, cerium oxide or zirconium oxide. More preferred is cerium oxide. The cerium oxide may form a solid solution with a metal oxide such as samarium oxide, gadolinium oxide, bismuth oxide, or zirconium oxide. The oxides may have an oxygen vacancy.

The layered double hydroxides are compounds represented by the following formula:

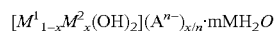

wherein $M^1$ represents any divalent metal ion of Mg, Fe, Zn, Ca, Li, Ni, Co, Cu, and Mn; $M^2$ represents any trivalent metal ion of Al, Fe, Mn, Co, Cr, and In; $A^{n-}$ represents a monovalent to trivalent anion such as $OH^-$, $Cl^-$, $NO_3^-$, $CO_3^{2-}$, or $COO^-$; m is 0 or greater; n is 1 to 3; and x is 0.20 to 0.40. $A^{n-}$ is preferably an anion having a valence of 2 or lower.

The layered double hydroxides may include naturally occurring ones (e.g. hydrotalcite, manasseite, motukoreaite, stichtite, sjogrenite, barbertonite, pyroaurite, iomaite, chlormagaluminite, hydrocalmite, green rust 1, berthierine, takovite, reevesite, honessite, eardlyite, and meixnerite) and artificially synthesized ones. The layered double hydroxides may also include dehydrated compounds resulting from calcination at 150° C. to 900° C., compounds where an anion between layers is decomposed, and compounds where an anion between layers is replaced with a hydroxide ion. Preferred among these layered double hydroxides are Mg—Al layered double hydroxides such as hydrotalcite. The layered double hydroxides may be coordinated with a compound having a functional group such as a hydroxy group, amino group, carboxyl group, or silanol group.

The hydroxides preferably include at least one compound selected from the group consisting of lithium hydroxide, sodium hydroxide, potassium hydroxide, calcium hydroxide, barium hydroxide, scandium hydroxide, yttrium hydroxide, lanthanoid hydroxide, zirconium hydroxide, niobium hydroxide, ruthenium hydroxide, nickel hydroxide, palladium hydroxide, copper hydroxide, cadmium hydroxide, boric acid, gallium hydroxide, indium hydroxide, thallium hydroxide, silicic acid, germanium hydroxide, tin hydroxide, lead hydroxide, phosphoric acid, and bismuth hydroxide. The hydroxide is more preferably, for example, cerium hydroxide or zirconium hydroxide.

Preferred examples of the phosphoric acid compounds include hydroxyapatite.

The hydroxyapatite is a compound represented by $Ca_{10}(PO_4)_6(OH)_2$. A hydroxyapatite compound in which the amount of Ca is reduced depending on the preparation conditions or a hydroxyapatite compound into which an element other than Ca is introduced may be used as the inorganic compound.

The compound containing at least one element selected from Groups I to XVII of the periodic table is more preferably a layered double hydroxide and/or an oxide, particularly preferably a layered double hydroxide. When the compound is a layered double hydroxide, the anion conducting membrane of the invention used as, for example, a separator or an electrode protection membrane can introduce an electrolyte solution and have enhanced anion conductivity.

The compound containing at least one element selected from Groups I to XVII of the periodic table has an average particle size of preferably 1,000 μm or smaller, more preferably 200 μm or smaller, still more preferably 100 μm or smaller, further preferably 75 μm or smaller, further more preferably 20 μm or smaller, still further more preferably 5 μm or smaller, particularly preferably 1 μm or smaller, particularly further preferably 0.5 μm or smaller, most preferably 0.3 μm or smaller. Also, the average particle size is preferably 0.001 μm or greater, more preferably 0.005 μm or greater, still more preferably 0.01 μm or greater.

The average particle size can be measured by a laser diffraction method.

The particles of the compound containing at least one element selected from Groups I to XVII of the periodic table may be in the form of, for example, fine powder, powder, particles, grains, scale-like particles, polyhedral particles, rod-like particles, or partially round particles. The particles having an average particle size within the above range can be produced by, for example, a method including grinding particles with a ball mill or the like, dispersing the resulting coarse particles in a dispersant to obtain particles having a desired particle size, and drying the particles; a method of sorting the coarse particles by particle size by, for example, passing the particles through a sieve; or a method for obtaining (nano)particles having a desired particle size by optimizing the conditions at the stage of particle production.

The compound containing at least one element selected from Groups I to XVII of the periodic table has a specific surface area of preferably 0.01 $m^2$/g or more, more preferably 0.1 $m^2$/g or more, still more preferably 0.5 $m^2$/g or more. Also, the specific surface area is preferably 500 $m^2$/g or less.

The specific surface area is determined by a nitrogen adsorption BET method using a specific surface area measuring device.

In order to improve the strength and ion conductivity of the anion conducting membrane, the proportion of the compound containing at least one element selected from Groups I to XVII of the periodic table is preferably 0.1% by mass or more, more preferably 1% by mass or more, still more preferably 10% by mass or more, further preferably 20% by mass or more, further more preferably 25% by mass or more, still further more preferably 30% by mass or more, particularly preferably 35% by mass or more, most preferably 40% by mass or more per 100% by mass of the anion conducting membrane-forming material. The proportion of the compound is preferably 99.9% by mass or less, more preferably 99% by mass or less, still more preferably 90% by mass or less, further preferably 85% by mass or less, further more preferably 80% by mass or less, still further more preferably 75% by mass or less, particularly preferably 70% by mass or less, particularly further preferably 65% by mass or less, particularly further more preferably 55% by mass or less, most preferably 50% by mass or less.

The aforementioned preferred proportion by mass of the inorganic compound in the anion conducting membrane-forming material shall apply to the preferred proportion by mass of the inorganic compound in the anion conducting membrane.

<Additional Component>

The anion conducting membrane of the invention may optionally contain an additional component as long as the membrane contains the conjugated diene based polymer and/or the (meth)acrylic based polymer and the compound containing at least one element selected from Groups I to XVII of the periodic table.

Examples of the additional component include hydrocarbon moiety-containing polymers as typified by olefins (e.g. polyethylene, polypropylene); aromatic group-containing polymers as typified by polystyrene; ether group-containing polymers as typified by alkylene glycols (e.g. polyethylene oxide, polypropylene oxide); hydroxy group-containing polymers as typified by polyvinyl alcohol, poly(α-hydroxymethyl acrylic acid salts), cellulose, methyl cellulose, hydroxyethylmethyl cellulose, hydroxypropylmethyl cellulose, and hydroxyalkyl cellulose (e.g. hydroxyethyl cellulose, hydroxypropyl cellulose); amide bond-containing polymers as typified by polyamide, nylon, polyacrylamide, polyvinyl pyrrolidone, and N-substituted polyacrylamide; imide bond-containing polymers as typified by polymaleimide and polyimide; carboxy group-containing polymers (including, for example, metal (e.g. alkali metals) salts of a carboxy group and ammonium salts) as typified by poly (meth)acrylic acid (salt), polymaleic acid (salt), polyitaconic acid (salt), polymethylene glutaric acid (salt), and carboxymethyl cellulose; halogen-containing polymers such as polyvinyl chloride, polyvinylidene fluoride, and polytetrafluoroethylene; polymers containing bonds created by ring-opening of epoxy groups, such as epoxy resins; sulfonic acid (salt) moiety-containing polymers; quaternary ammonium salt- or quaternary phosphonium salt-containing polymers as typified by polymers containing a group represented by $AR^1R^2R^3B$ (wherein A represents N or P; B represents an anion such as a halogen anion or $OH^-$; $R^1$, $R^2$, and $R^3$ are the same as or different from each other and each represent a C1-C7 alkyl group, hydroxyalkyl group, alkyl carboxyl group, or aromatic ring group; and $R^1$, $R^2$, and $R^3$ may optionally be bonded to each other to form a ring structure); ion exchange polymers used in cation and anion exchange membranes; saccharides as typified by cellulose acetate, chitin, chitosan, and alginic acid (salt); amino group-containing polymers as typified by polyethylenimine; carbamate group moiety-containing polymers; carbamide group moiety-containing polymers; epoxy group moiety-containing polymers; heterocyclic ring- and/or ionized heterocyclic ring moiety-containing polymers; polymer alloys; heteroatom-containing polymers; and polymers other than the conjugated diene based polymers, such as low-molecular-weight surfactants. These polymers exclude the conjugated diene based polymer and the (meth)acrylic based polymer in the invention. One or two or more of these may be used. The strength of the membrane can be enhanced, for example, by adding such a polymer other than the conjugated diene based polymer and the (meth)acrylic based polymer in the invention.

Each of these polymers may be crosslinked with a known organic crosslinking compound.

The uniformity and strength of the membrane can be enhanced, for example, by adding such a polymer other than the conjugated diene based polymer and the (meth)acrylic based polymer.

Preferred among the polymers other than the conjugated diene based polymer and the (meth)acrylic based polymer in the invention are halogen-containing polymers, carboxy group-containing polymers, and hydroxy group-containing polymers.

That is, the anion conducting membrane-forming material in the invention preferably further contains at least one selected from the group consisting of halogen-containing polymers, carboxy group-containing polymers, and hydroxy group-containing polymers. The halogen-containing polymers refer to polymers containing a halogen atom, excluding the conjugated diene based polymer and (meth)acrylic based polymer. Examples of the halogen-containing polymers include fluorine-containing polymers such as polyvinylidene fluoride and polytetrafluoroethylene; chlorine-containing polymers such as polyvinyl chloride; bromine-containing polymers; and iodine-containing polymers. Preferred among these are fluorine-containing polymers. The carboxy group-containing polymers refer to polymers containing a carboxy group, excluding the conjugated diene based polymer and the (meth)acrylic based polymer. The hydroxy group-containing polymers refer to polymers containing a hydroxy group, excluding the conjugated diene based polymer and the (meth)acrylic based polymer. More preferably, the anion conducting membrane-forming material contains at least one selected from the group consisting of fluorine-containing polymers, poly(meth)acrylic acid (salts), carboxymethyl cellulose, methyl cellulose, hydroxyethyl cellulose, and hydroxypropyl cellulose.

The amount of the polymer(s) other than the conjugated diene based polymer and the (meth)acrylic based polymer in the invention is preferably 1% to 20% by mass, more preferably 2% to 10% by mass per 100% by mass of the anion conducting membrane-forming material in terms of the uniformity of the material and the forming properties of the membrane.

When the anion conducting membrane contains two or more polymers other than the conjugated diene based polymer and the (meth)acrylic based polymer in the invention, the aforementioned amount means the combined amount of the two or more polymers.

The weight average molecular weight of the polymer other than the conjugated diene based polymer and the (meth)acrylic based polymer in the invention is preferably similar to the weight average molecular weights of the conjugated diene based polymer and the (meth)acrylic based polymer in the invention as described above, and is measured by the same method as for the conjugated diene based polymer and the (meth)acrylic based polymer.

The conjugated diene based polymer, the (meth)acrylic based polymer, and the polymers other than these in the invention each can be obtained by polymerization of a monomer that forms a constitution unit of the corresponding polymer, such as radical polymerization, radical (alternating) copolymerization, anionic polymerization, anionic (alternating) copolymerization, cationic polymerization, cationic (alternating) copolymerization, graft polymerization, graft (alternating) copolymerization, living polymerization, living (alternating) copolymerization, dispersion polymerization, emulsion polymerization, suspension polymerization, ring-opening polymerization, cyclization polymerization, polymerization by light, UV light, or electron beam irradiation, metathesis polymerization, or electrolysis polymerization. When these polymers have a functional group, the functional group may be present in the main chain and/or a side chain, or may be present as a binding site with a crosslinking agent. One or two or more of the polymers may be used.

Each polymer may be crosslinked by an organic crosslinking agent compound other than the compound containing at least one element selected from Groups I to XVII through a bond such as an ester bond, an amide bond, an ionic bond, a van der Waals bond, an agostic interaction, a hydrogen bond, an acetal bond, a ketal bond, an ether bond, a peroxide bond, a carbon-carbon bond, a carbon-nitrogen bond, a carbon-oxygen bond, a carbon-sulfur bond, a carbamate bond, a thiocarbamate bond, a carbamide bond, a thiocarbamide bond, an oxazoline moiety-containing bond, or a triazine bond.

Examples of the additional component optionally contained in the anion conducting membrane-forming material of the invention include, in addition to the polymers other than the conjugated diene based polymer and the (meth)acrylic based polymer, inorganic components such as alumina, silica, conductive carbon, and conductive ceramics, and solvents. The additional component can assist the anion conductivity, for example.

The inorganic components each preferably have an average particle size of 5 μm or smaller. The average particle size is preferably 1 μm or smaller, more preferably 0.5 μm or smaller, still more preferably 0.1 μm or smaller. Also, the average particle size is preferably 0.001 μm or greater, more preferably 0.01 μm or greater.

The average particle size of the inorganic component can be measured by the same method as for the average particle size of the compound containing at least one element selected from Groups I to XVII.

In terms of the membrane strength, the proportion of the inorganic component is preferably 1% by mass or less, more preferably 0.5% by mass or less, still more preferably 0.2% by mass or less per 100% by mass of the anion conducting membrane-forming material.

Examples of the solvents include one or two or more of water and organic solvents such as methanol, ethanol, propanol, isopropanol, butanol, hexanol, tetrahydrofuran, and N-methylpyrrolidone.

In order to suppress shrinkage of the membrane during its formation, the proportion of the solvents contained is preferably 20% to 60% by mass per 100% by mass of the anion conducting membrane-forming material. The proportion is more preferably 30% to 50% by mass, still more preferably 40% by mass or less, particularly preferably 35% by mass or less. Controlling the proportion of the solvent within the above range suitably enables control of the liquid absorption rate of the anion conducting membrane of the invention.

When the polymer(s) in the anion conducting membrane-forming material is in the form of emulsion, a dispersion medium in which the emulsion polymer is dispersed is also regarded as a solvent.

<Method for Producing Anion Conducting Membrane>

A method for producing the anion conducting membrane of the invention includes preparing an anion conducting membrane-forming material and forming a membrane from the resulting anion conducting membrane-forming material.

The anion conducting membrane-forming material of the invention can be prepared by the following method, for example.

The polymer, the compound containing at least one element selected from Groups I to XVII of the periodic table, and optionally an additional component are mixed (kneaded). They may be mixed using, for example, a mixer, a blender, a kneader, a bead mill, a ready mill, a roll mill, or a ball mill. At the time of the mixing, water, an organic solvent such as methanol, ethanol, propanol, isopropanol, butanol, hexanol, tetrahydrofuran, or N-methylpyrrolidone, or a solvent mixture of water and an organic solvent may be added. In the mixing, the polymer is preferably dispersed in water or another solvent to prepare a dispersion. Thus, a denser anion conducting membrane can be obtained, and the effect of preventing dendrite growth can be further enhanced. Here, since the air permeance and the piercing strength can increase, the value X can become larger.

The mixing time may be appropriately selected, and is preferably two minutes or more, more preferably four minutes or more, still more preferably six minutes or more, particularly preferably eight minutes or more. In particular, the mixing time is preferably longer at high temperatures (for example, at 40° C. or higher). With such a mixing time, a denser anion conducting membrane can be obtained. Here, since the air permeance and the piercing strength can increase, the value X can become larger.

The upper limit of the mixing time is not limited, and, for example, the mixing time is preferably 30 minutes or less.

The mixing temperature may be appropriately selected, and is preferably 20° C. or higher, more preferably 30° C. or higher, still more preferably 40° C. or higher, particularly preferably 50° C. or higher. With such a mixing temperature, a denser anion conducting membrane can be obtained. Here, since the air permeance and the piercing strength increase, the value X can become larger.

The upper limit of the mixing temperature is not, limited as long as the polymer and the compound containing at least one element selected from Groups I to XVII of the periodic table do not decompose. The mixing temperature is preferably, for example, 200° C. or lower.

The anion conducting membrane-forming material in the invention may be in any form capable of being formed into a membrane, and may be in the form of, for example, clay, paste, or slurry.

The anion conducting membrane may be produced from the anion conducting membrane-forming material by any method as long as the membrane is formed. Specifically, the anion conducting membrane-forming material may be formed into a membrane by pressing with a roller, pressing with a flat plate, or may be formed into a membrane by injection molding, extrusion molding, or casting. Each of these methods may be used alone, or two or more of these may be used in combination.

The anion conducting membrane of the invention is preferably obtained by kneading the anion conducting membrane-forming material, and then pressing the resulting kneaded mixture into a membrane.

When the anion conducting membrane of the invention is used as an electrode protection membrane, the anion conducting membrane-forming material may be pressed into a membrane on an active material layer of an electrode.

When the anion conducting membrane-forming material contains a fluorine-containing polymer, the fluorine-containing polymer is subjected to strong force during pressing and is acceleratedly formed into fibers. As a result, the air permeance and the strength of the anion conducting membrane of the invention can increase, and the value X therefore can become larger.

Such a method for producing an anion conducting membrane, that is, a method for producing an anion conducting membrane including forming a membrane from an anion conducting membrane-forming material that contains a conjugated diene based polymer and/or a (meth)acrylic based polymer and a compound containing at least one element selected from Groups I to XVII of the periodic table is also one aspect of the invention. The above-described anion conducting membrane-forming material is preferably used in the production method, and the anion conducting membrane produced by the production method is preferably the same as the above-described anion conducting membrane of the invention.

In addition to forming a membrane from the anion conducting membrane-forming material, the production method may optionally include drying the membrane. The drying temperature may appropriately be selected, and may be 60° C. to 160° C.

For example, the production method preferably includes heating the membrane after forming a membrane from the anion conducting membrane-forming material. This can appropriately reduce the liquid absorption rate of the anion conducting membrane.

The heating temperature of the membrane may appropriately be selected, and is preferably, for example, 60° C. or higher and 180° C. or lower. The heating temperature is preferably 160° C. or lower and more preferably 150° C. or lower. The heating temperature may be changed stepwise. At a heating temperature falling within such a temperature range, the life performance of the anion conducting membrane can be further enhanced.

Since the anion conducting membrane of the invention does not impair the cell performance and can more sufficiently suppress dendrite growth, it can be used as a cell component such as a separator, an electrolyte (membrane), or an electrode protection membrane. That is, the anion conducting membrane of the invention is preferably used as a cell component, more preferably used as a separator, for example. In other words, the invention also relates to a method of using an anion conducting membrane, the method including a step of constituting a cell using the anion conducting membrane of the invention as a cell component. The step of constituting a cell preferably includes, for example, a step of placing the anion conducting membrane of the invention as a separator between a positive electrode and a negative electrode. In the step of placing, the anion conducting membrane of the invention and the positive electrode and the negative electrode may be placed in any order as long as the anion conducting membrane of the invention is placed as a separator between the positive electrode and the negative electrode.

The anion conducting membrane of the invention can extend the life of, for example, secondary cells that contain a safe and inexpensive negative electrode having a high energy density (e.g. manganese-zinc (storage) cells, nickel-hydrogen (storage) cells, nickel-zinc (storage) cells, zinc ion (storage) cells, silver-zinc (storage) cells, zinc-halogen (storage) cells), and can popularize such secondary cells. Such an anion conducting membrane can also be used in electrochemical devices such as alkaline (ion) (storage) cells, alkaline earth (ion) (storage) cells, nickel-hydrogen (storage) cells, nickel-cadmium (storage) cells, lead storage cells, fuel cells, and capacitors; or can also be used as a component of primary cells such as air-zinc cells and alkaline manganese cells, ion exchange materials, or trace element adsorbents.

<Cell Component>

The invention also relates to a cell component including the anion conducting membrane of the invention. The cell component includes a separator, an electrolyte, and an electrode. Use of such a cell component can extend the cell life.

When the cell component of the invention is an electrode, the anion conducting membrane of the invention is used as an electrode protection membrane to cover an active material layer of the electrode.

The active material layer of the electrode contains an active material and a binder, and may optionally further contain a conductive aid and an additional component, for example.

The active material may be a positive electrode active material or a negative electrode active material.

When the electrode of the invention is a negative electrode, the active material of the negative electrode may be any one commonly used as a negative electrode active material of a cell, such as a carbon species, a cadmium species, a lithium species, a sodium species, a magnesium species, a lead species, a zinc species, a nickel species, a tin species, a silicon-containing material, a hydrogen absorbing alloy material, or a noble metal material (e.g., platinum). In particular, the active material of the electrode of the invention preferably contains a zinc species or a cadmium species, more preferably a zinc species. In such cases, the effects of the invention are significantly achieved. Here, the zinc species means an elemental zinc metal or a zinc compound, and the cadmium species means an elemental cadmium metal or a cadmium compound, for example. The same shall apply to a lithium species, a sodium species, a magnesium species, a lead species, a zinc species, and a tin species.

When the electrode of the invention is a positive electrode, the active material of the positive electrode may be any one commonly used as a positive electrode active material of a primary or secondary cell. Examples thereof include oxygen (when the positive electrode active material is oxygen, the positive electrode is an air electrode made of a compound that can reduce oxygen or oxidize water, such as a perovskite compound, a cobalt-containing compound, an iron-containing compound, a copper-containing compound, a manganese-containing compound, a vanadium-containing compound, a nickel-containing compound, an iridium-containing compound, or a platinum-containing compound; a palladium-containing compound; a gold-containing compound; a silver-containing compound; or a carbon-containing compound); nickel-containing compounds such as nickel oxyhydroxide, nickel hydroxide, and cobalt-containing nickel hydroxide; manganese-containing compounds such as manganese dioxide; silver oxide; lithium-containing compounds such as lithium cobaltate; iron-containing compounds; zinc species such as metal zinc and zinc oxide; and other cobalt-containing compounds.

The active material contained in the active material layer of the electrode of the invention is preferably a negative electrode active material.

The binder may be any of a variety of known polymers, thermoplastic or thermosetting. Examples of the binder include halogen-containing polymers such as polyvinylidene fluoride and polytetrafluoroethylene; hydrocarbon moiety-containing polymers such as polyolefins; aromatic group-containing polymers such as polystyrene; ether group-containing polymers such as alkylene glycols; hydroxy group-containing polymers such as polyvinyl alcohol; amide bond-containing polymers such as polyamide and polyacrylamide; imide group-containing polymers such as polymaleimide; carboxyl group-containing polymers such as poly(meth)acrylic acid; carboxylic acid salt group-containing polymers such as poly(meth)acrylic acid salts; sulfonic acid salt moiety-containing polymers; quaternary ammonium salt- or quaternary phosphonium salt-containing polymers; ion-exchange polymers; natural rubber; synthetic rubber such as styrene-butadiene rubber (SBR); saccharides such as hydroxyalkyl cellulose (e.g. hydroxyethyl cellulose) and carboxymethyl cellulose; amino group-containing polymers such as polyethyleneimine; and polyurethane. One or two or more of these binders may be used.

Examples of the conductive aid include, but are not limited to, conductive carbon; conductive ceramics; and metals such as zinc, copper, brass, nickel, silver, bismuth, indium, lead, and tin. One or two or more of these may be used.

One or two or more selected from organic compounds, organic compound salts, and compounds containing at least one element selected from the group consisting of elements of Groups I to XVII of the periodic table may be used as the additional component.

The average thickness of the active material layer according to the invention is preferably 100 μm or larger, more preferably 200 μm or larger, still more preferably 500 μm or larger. When the anion conducting membrane of the invention is used as an electrode protection membrane, the average thickness of the active material layer is particularly preferably 1 mm or larger. At such an average thickness, failing off of the active material can be prevented and a cell with a high energy density containing a large amount of the active material can be obtained. The average thickness of the active material layer is, for example, preferably 10 mm or smaller, more preferably 5 mm or smaller. The average thickness of the active material layer can be determined by averaging the thicknesses at any five points in the active material layer measured with a micrometer.

The electrode of the invention further includes a current collector.

Examples of the current collector include (electrodeposited) copper foil, copper meshes (expandable metals), foamed copper, punched copper, copper alloys (e.g. brass), brass foil, brass meshes (expandable metals), foamed brass, punched brass, nickel foil, corrosion-resistant nickel, nickel meshes (expandable metals), punched nickel, zinc metal, corrosion-resistant zinc metal, zinc foil, zinc meshes (expandable metals), (punched) steel plates, and conductive nonwoven fabrics; Ni, Zn, Sn, Pb, Hg, Bi, In, Tl, or brass-doped (electrodeposited) copper foil, copper meshes (expandable metals), foamed copper, punched copper, copper alloys (e.g. brass), brass foil, brass meshes (expandable metals), foamed brass, punched brass, nickel foil, corrosion-resistant nickel, nickel meshes (expandable metals), punched nickel, zinc metal, corrosion-resistant zinc metal, zinc foil, zinc meshes (expandable metals), (punched) steel plates, and nonwoven fabrics; Ni, Zn, Sn, Pb, Hg, Bi, In, Tl, or brass-plated (electrodeposited) copper foil, copper meshes (expandable metals), foamed copper, punched copper, copper alloys (e.g. brass), brass foil, brass meshes (expandable metals), foamed brass, punched brass, nickel foil, corrosion-resistant nickel, nickel meshes (expandable metals), punched nickel, zinc metal, corrosion-resistant zinc metal, zinc foil, zinc meshes (expandable metals), (punched) steel plates, and nonwoven fabrics; silver; and materials used as a current collector or a container of alkaline (storage) cells or air-zinc cells.

When the cell component of the invention is an electrolyte, the anion conducting membrane of the invention may be used as a solid electrolyte.

When the cell component of the invention is a separator, the anion conducting membrane of the invention may be used as a separator. It is a preferred embodiment of the invention that the cell component of the invention is a separator.

<Cell>

The anion conducting membrane of the invention may preferably be used as a cell component such as a cell separator. A cell including the cell component such as a separator has an extended cell life.

The cell component including the anion conducting membrane of the invention, such as a separator, is also one aspect of the invention, and the cell including the cell component of the invention, such as a separator, is also one aspect of the invention.

The cell of the invention has only to include any of a separator, a positive electrode, a negative electrode, and an electrolyte solution (electrolyte), each of which includes the anion conducting membrane of the invention.

Although the anion conducting membrane of the invention functions as a separator in the cell of the invention, an additional separator may be placed on the membrane. In the cell of the invention, the anion conducting membrane of the invention used as a cell component other than a separator (electrolyte and/or electrode) also plays a role as a separator. Thus, there is no need to use an additional separator, but one or more commonly used separators may be used.

The commonly used separators may be any material that separates a positive electrode from a negative electrode and holds an electrolyte solution to reliably obtain ion conductivity between the positive electrode and the negative electrode. Examples of the separators include non-woven fabric, filter paper, membranes made from hydrocarbon moiety-containing polymers such as polyethylene and polypropylene, polytetrafluoroethylene moiety-containing polymers, polyvinylidene fluoride moiety-containing polymers, cellulose, fibrillated cellulose, viscose rayon, cellulose acetate, hydroxyalkyl cellulose, carboxymethylcellulose, polyvinyl alcohol-containing polymers, cellophane, aromatic ring moiety-containing polymers such as polystyrene, polyacrylonitrile moiety-containing polymers, polyacrylamide moiety-containing polymers, polyvinyl halide moiety-containing polymers, polyamide moiety-containing polymers, polyimide moiety-containing polymers, ester moiety-containing polymers such as nylon, poly(meth)acrylic acid moiety-containing polymers, poly(meth)acrylic acid salt moiety-containing polymers, hydroxy group-containing polymers such as polyisoprenol and poly(meth)allyl alcohol, carbonate group-containing polymers such as polycarbonate, ester group-containing polymers such as polyester, carbamate- or carbamide group moiety-containing polymers such as polyurethane, agar, gel compounds, organic-inorganic hybrid (composites) compounds, ion exchange membrane polymers, cyclization polymers, sulfonic acid salt-containing polymers, quaternary ammonium salt-containing polymers, quaternary phosphonium salt polymers, cyclic hydrocarbon group-containing polymers, ether group-containing polymers, and inorganic substances such as ceramics. Two or more of these separators may be used.

The anion conducting membrane of the invention and a separator additionally placed thereon may be integrated with each other to form a laminated structure or may be independently stacked to form a laminated structure. When they closely adhere to each other to form a laminated structure, the laminated structure may have a clear interface or may have a layer of a mixture of these components.

Any positive electrode active material commonly used in a primary or secondary cell may be used as an active material of the positive electrode of the cell of the invention. For example, when the electrode of the invention is a positive electrode, the above-described positive electrode active materials may be used.

In particular, it is a preferred embodiment of the invention that the positive electrode active material is a nickel-containing compound or a zinc species.

In addition, it is also a preferred embodiment of the invention that the positive electrode active material is oxygen in cells such as air cells and fuel cells.

When the electrode of the invention is a negative electrode, the active material of the negative electrode of the cell of the invention may be a negative electrode active material commonly used in a cell, such as the negative electrode active materials described above. In particular, preferred are a carbon species, a lithium species, a sodium species, a magnesium species, a zinc species, a nickel species, a tin species, a cadmium species, a hydrogen absorbing alloy material, and a silicon-containing material. In particular, in order to achieve the performance of the anion conducting membrane of the invention, active materials possibly generating dendrites along with the electrode reaction, such as a zinc species, a lithium species, a magnesium species, a nickel species, and a cadmium species, can suitably be used as they are.

The electrode of the cell of the invention may be produced by forming an active material layer on a current collector. Examples of the current collector of the electrode of the invention include those listed above as the current collector of the electrode of the invention.

The anion conducting membrane of the invention can be used as a solid electrolyte, and also can be used as an ion exchange membrane. When the anion conducting membrane of the invention is used as an ion exchange membrane, an electrolyte solution or a gel electrolyte can be additionally used as an electrolyte material. The electrolyte solution of the cell of the invention may be any one commonly used as an electrolyte solution of a cell, and examples thereof include a water-containing electrolyte solution and an organic solvent-based electrolyte solution. Preferred is a water-containing electrolyte solution. The water-containing electrolyte solution refers to an electrolyte solution (aqueous electrolyte solution) in which only water is used as an electrolyte solution material or refers to an electrolyte solution in which a liquid prepared by adding an organic solvent to water is used as an electrolyte solution material. Further, the anion conducting membrane of the invention can also exhibit anion conductivity even under humid conditions, heating conditions, or in the absence of the electrolyte solution or the solvent.

The aqueous electrolyte solution is preferably an alkaline electrolyte solution. Examples of the alkaline electrolyte solution include a potassium hydroxide aqueous solution, a sodium hydroxide aqueous solution, a lithium hydroxide aqueous solution, a zinc sulfate aqueous solution, a zinc nitrate aqueous solution, a zinc phosphate aqueous solution, and a zinc acetate aqueous solution. Preferred among these are alkaline electrolytes such as a potassium hydroxide aqueous solution, a sodium hydroxide aqueous solution, and a lithium hydroxide aqueous solution. One or two or more of the aqueous electrolyte solutions may be used.

The water-containing electrolyte solution may optionally contain an organic solvent used for an organic solvent-based electrolyte solution. Examples of the organic solvent include ethylene carbonate, propylene carbonate, dimethyl carbonate, diethyl carbonate, γ-butyrolactone, dimethoxymethane, diethoxymethane, dimethoxyethane, tetrahydrofuran, methyltetrahydrofuran, diethoxyethane, dimethylsulfoxide, sulfolane, acetonitrile, benzonitrile, ionic liquids, fluorine-containing carbonates, fluorine-containing ethers, polyethylene glycols, and fluorine-containing polyethylene glycols. One or two or more of the organic solvent-based electrolyte solutions may be used. Preferred examples of the electrolyte of the organic solvent-based electrolyte solution include, but are not limited to, LiPF$_6$, LiBF$_4$, LiB(CN)$_4$, lithium bis(fluorosulfonyl)imide (LiFSI), and lithium bis(trifluoromethylsulfonyl)imide (LiTFSI).

In the case of the water-containing electrolyte solution containing the organic solvent-based electrolyte solution, the amount of the aqueous electrolyte solution is preferably 10% to 99.9% by mass, more preferably 20% to 99.9% by mass based on the combined amount (100% by mass) of the aqueous electrolyte solution and the organic solvent-based electrolyte solution.

Any electrolyte usable in a cell may be used as a gel electrolyte of the cell of the invention, and examples of the gel electrolyte include a solid electrolyte containing the same compound as in the separator and a gel electrolyte crosslinked by a crosslinking agent.

The cell of the invention may be in any form such as a primary cell, a rechargeable secondary cell (storage cell), a cell employing mechanical charging (mechanical exchange of a zinc negative electrode), a cell including a third electrode (an electrode suitable for charge and an electrode suitable for discharge are used as positive electrodes), a cell including a third electrode in addition to the positive electrode and the negative electrode (e.g. an electrode that removes oxygen and hydrogen generated during charge and discharge), or a fuel cell. Preferred is a secondary cell or a fuel cell.

The type of the cell of the invention is not limited, and the cells described as a cell capable of using the anion conducting membrane of the invention are preferred.

The cell of the invention can be produced appropriately using a known method. For example, a negative electrode is placed in a cell container, then an electrolyte solution is introduced into the cell container, and a positive electrode, a reference electrode, a separator, and other components are placed in the cell container as needed to prepare a cell.

Advantageous Effects of Invention

The anion conducting membrane of the invention having the constitution as described above has selective permeability to hydroxide ions and effectively suppresses dendrite growth. Therefore, the anion conducting membrane of the invention is suitable for, for example, separators of cells including an electrode active material which generates dendrites, particularly, separators of cells including a zinc species.

DESCRIPTION OF EMBODIMENTS

Figure 1:
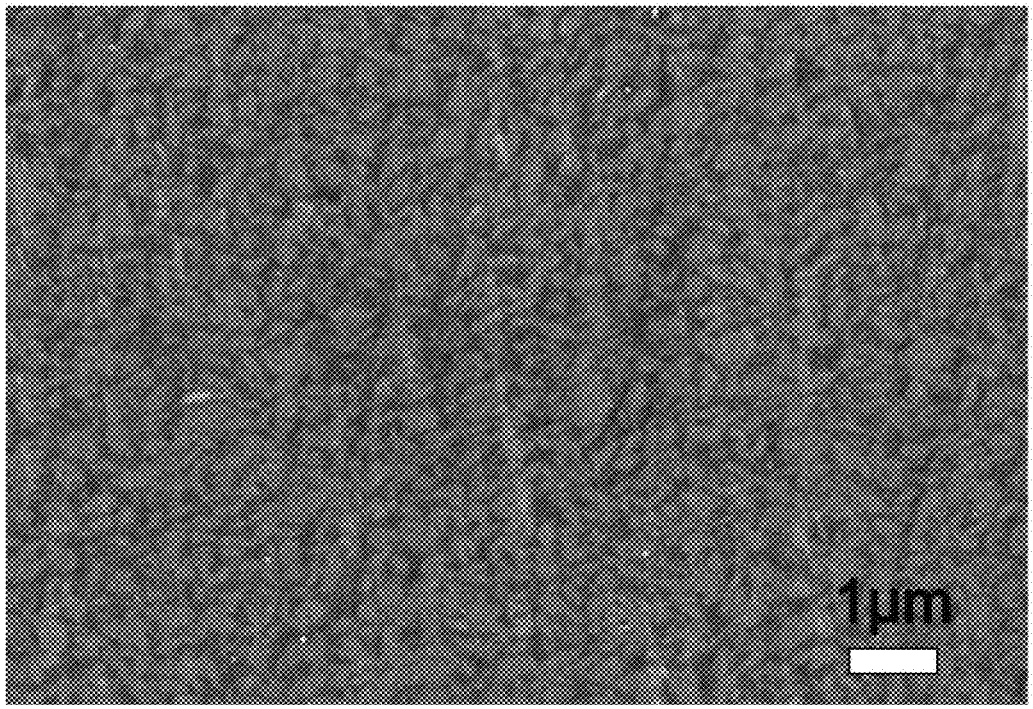
FIG. 1 shows the cross-section of the 100-μm-thick anion conducting membrane prepared in Example 1-1 observed with a scanning electron microscope.

The invention is described in more detail below with reference to examples, but is not limited thereto. Unless otherwise mentioned, the term "part(s)" means "part(s) by weight" and "%" means "% by mass".

The following describes the measurement methods employed in the examples.

<Air Permeance>

In the examples, the air permeance (s) was measured in accordance with the Oken method (JIS P 8117) using an oken type air-permeability & smoothness tester KY-55 produced by Asahi Seiko Co., Ltd., and the measurement values were averaged.

The upper limit of the measurement time was set to 30,000 s. When the measurement time exceeded this upper limit, the air permeance was regarded as 30,000 s. That is, in the examples, an air permeance of 30,000 s means an air permeance of at least 30,000 s. Therefore, the value X determined using such an air permeance means the minimum estimated value X.

<Piercing Strength>

The piercing strength (N) was measured in accordance with JIS Z 1707-1997 using a digital force gauge ZTA-50N (produced by Imada Co., Ltd.). A specimen was fixed, and pierced with a needle-like jig having a diameter of 1.0 mm and a semicircular tip shape with a radius of 0.5 mm at a rate of 50±5 ram/min. The maximum stress generated until the tip of the jig penetrated through the specimen was measured. The maximum stress values of five or more specimens were averaged.

<Density>

The density (g/cm$^3$) of an anion conducting membrane was determined by measuring the mass and the volume of a specimen of the membrane, and dividing the mass by the volume. The volume of the specimen was determined from the length and the width thereof measured using a caliper and the thickness thereof measured in accordance with the following method of measuring the membrane thickness. After the determination of the volume, the mass of the specimen was measured using a precision balance (four decimal places).

<Thickness of Membrane>

The thicknesses (μm) of an anion conducting membrane and a coating made of an insulating substance were measured using a film thickness meter (trade name: Digimatic Indicator 543-394 produced by Mitutoyo Corporation). The thickness was measured at three points of a specimen, and the resulting values were averaged.

<Calculation of Value X>

The value X was determined using the following equation (1), where T (s) represents the air permeance, F (N) represents the piercing strength, ρ (g/cm$^3$) represents the density, and L (μm) represents the thickness of a membrane. They were determined by the above-described methods.

$$X = 0.005 \times \frac{T^2 \times F \times \rho}{L} \qquad (1)$$

<Liquid Absorption Rate>

Ten square specimens with a size of 25 mm×25 mm were randomly cut from an anion conducting membrane, and the masses ($M_b$) of the dried specimens and the masses ($M_a$) of the specimens after immersion overnight in a 6.7 mol/L KOH aqueous solution saturated with zinc oxide were measured to determine the liquid absorption rate values. These values were averaged to determine the liquid absorption rate.

<Degree of Swelling>

Ten square specimens with a size of 25 mm×25 mm were randomly cut from an anion conducting membrane, and the thicknesses ($T_b$) of the dried specimens and the thicknesses ($T_a$) of the specimens after immersing overnight in a 6.7 mol/L KOH aqueous solution were measured to determine the values of degree of swelling. These values were averaged to determine the degree of swelling.

<Resistance Value>

The resistance value (Ω) was measured under the following conditions.

Number of cells placed: Five cells (average)
Composition of Each Cell
Working electrode: Ni plate
Counter electrode: Ni plate
Electrolyte solution: 6.7 mol/L KOH aqueous solution saturated with zinc oxide
Measurement sample: immersed in the electrolyte solution overnight
Effective area: φ15 mm AC impedance was measured. The prepared test object was allowed to stand in a thermostatic bath at 25° C. for 30 minutes, and AC impedance was measured under the following conditions.

Applied voltage: 10 mV vs. open circuit voltage
Frequency domain: 100 kHz to 100 Hz The resistance value (R) was determined by the following formula using an intercept component (Ra) obtained from the impedance and an intercept component (Rb) in the case of using no measurement sample.

$$R=(Ra-Rb).$$

<Charge and Discharge Test>

Zinc oxide powder (produced by Mitsui Mining and Smelting Co., Ltd.), an aqueous dispersion of polytetrafluoroethylene (trade name: D210C produced by Daikin Industries, Ltd., solid content: 60%), and carbon powder (trade name: Ketjen Black EC600JD produced by Lion Specialty Chemicals Co., Ltd.) were kneaded at a ratio by mass of 59:5:4 to prepare an active material. The active material was placed on a punched nickel to prepare a zinc negative electrode. A positive electrode was prepared by attaching a zinc plate and the above-described active material to a punched nickel. A single-layer anion conducting membrane was placed between these electrodes. The charge and discharge cycle was performed using a mercury electrode as a reference electrode at a charge and discharge current of 60 mA/cm$^2$ for 10 minutes to confirm charge and discharge characteristics of the anion conducting membrane.

The number of cells placed: Five cells (average)
Reference electrode: Mercury electrode
Electrolyte solution: 6.7 mol/L KOH aqueous solution saturated with zinc oxide <Average Particle Size of Inorganic Compound Particles>

The average particle size of the particles of an inorganic compound was measured using a dispersion prepared by dispersing the particles of an inorganic compound in a below-described dispersion medium by laser diffraction (apparatus name: laser diffraction-scattering particle size distribution measuring apparatus LA-950 produced by HORIBA, Ltd., dispersion medium: 0.2% by mass sodium hexametaphosphate-containing ion exchange water). Thus, a 50% volume average particle size was determined as the volume average particle size.

<Volume Average Particle Size of Polymer Aqueous Dispersion>

The volume average particle size of a polymer aqueous dispersion was measured as follows: an aqueous dispersion of a polymer was diluted with distilled water, and about 10 mL of the dilution was put into a glass cell, and subjected to dynamic light scattering using a particle size distribution analyzer (trade name: NICOMP Model 380 produced by Particle Sizing Systems). Thus, a 50% volume average particle size was determined as the volume average particle size.

<Glass Transition Temperature of Polymer>

The glass transition temperature was measured as follows: a polymer was applied to a glass plate and dried at 120° C. for one hour to form a polymer film, and the glass transition temperature of the resulting polymer film was measured using a differential scanning calorimeter (apparatus name: thermal analyzer DSC3100S produced by BRVKER).

<Area Ratio Between Particles of Compound and Components of Anion Conducting Membrane-Forming Material Other than the Compound>

The area ratio was determined as follows: the anion conducting membrane was cut perpendicular to the surface of the membrane to prepare a membrane cross-section (the membrane cross-section was prepared using a 10 mm×10 mm area in the short-side central portion of the anion conducting membrane), and 10000× magnified images of any five different points of the cross-section were taken using a scanning electron microscope so that the anion conducting membrane-forming material portion accounted for 70% or more of the cross-section. An area of 8 μm in the thickness direction×12 μm in the plane direction was randomly selected in each magnified image of the cross-section, and opened in Microsoft Paint Ver. 5.1, graphic software produced by Microsoft, and further the area of the anion conducting membrane-forming material portion was extracted and converted to black-and-white. In the converted image, the area of other than the inorganic compound particles was represented by black, and the area of the inorganic compound particles was represented by white. The resulting image was analyzed using image analysis software produced by Image metrology to determine the ratio between the combined area of the inorganic compound particles and the combined area of other than the inorganic compound particles in the image. In the processing, the contrast of the black and white areas was increased to represent the particles as distinct dots.

<Proportion of Voids>

Similarly to the above area ratio, the area ratio was determined as follows: the anion conducting membrane was cut perpendicular to the surface of the membrane to prepare a membrane cross-section (the membrane cross-section was prepared using a 10 mm×10 mm area in the short-side central portion of the anion conducting membrane), and 10000-times magnified images of any five different points of the cross-section were taken using a scanning electron microscope so that the anion conducting membrane-forming material portion accounted for 70% or more of the cross-section. An area of 8 μm in the thickness direction×12 μm in the plane direction was randomly selected in each magnified image of the cross-section was opened in Microsoft Paint Ver. 5.1, graphic software produced by Microsoft, and further the area of the anion conducting membrane-forming material portion was extracted and converted to black-and-white. In the converted image, the area of the voids was represented by black, and the area of components was represented by white. The resulting image was analyzed using image analysis software produced by Image metrology to determine the proportion of the voids in the image. In the processing, the contrast of the black and white areas was increased to represent the voids as distinct dots.

<Cross-Sectional Particle Size of Inorganic Compound Particles in Membrane>

Similarly to the above area ratio, the area ratio was determined as follows: the anion conducting membrane was cut perpendicular to the surface of the membrane to prepare a membrane cross-section (the membrane cross-section was prepared using a 10 mm×10 mm area in the short-side central portion of the anion conducting membrane), and 10000× magnified images of any five different points of the cross-section were taken using a scanning electron microscope so that the anion conducting membrane-forming material portion accounted for 70% or more of the cross-section. Here, the contrast was adjusted so that only the area of the particles of the inorganic compound was represented by white in the following image processing and the adjusted image was saved. An area of 8 µm in the thickness direction × 12 µm in the plane direction was randomly selected in each magnified image of the cross-section was opened in Microsoft Paint Ver. 5.1, graphic software produced by Microsoft, and further the area of the anion conducting membrane-forming material portion was extracted and converted to black-and-white. In the converted image, the area of the inorganic compound particles was represented by white. The resulting image was analyzed using image analysis software produced by Image metrology to determine the particle size of the inorganic compound particles from the white area in the image. In the processing, the contrast of the black and white areas was increased to represent the particles as distinct dots. One hundred particles were measured, and the resulting values were averaged to give the cross-sectional particle size. When elliptical particles were observed, the value of the major axis and the value of the minor axis were measured and averaged for 100 particles, and the resulting average values were averaged to determine the cross-sectional particle size.

<Evaluation of Membrane-Forming Properties>

The membrane-forming properties were evaluated as follows.
0. No membrane was formed.
1. A membrane was formed, but partly adhered to a roller and broken.
2. Breakage and damage were less, but much unevenness was observed.
3. A strong membrane was formed.

Preparation Example of (Meth)Acrylic Based Polymer

Preparation Example 1

A flask equipped with a dropping funnel, a stirrer, a nitrogen inlet tube, a thermometer, and a reflux condenser was charged with 64 parts by mass of deionized water. Separately, in the dropping funnel, a pre-emulsion was prepared from 26 parts by mass of deionized water, 4 parts by mass of a 10% aqueous solution of sodium dodecylbenzenesulfonate, 1.5 parts by mass of 1,6-hexanediol dimethacrylate, 46.5 parts by mass of methyl methacrylate, 50 parts by mass of dodecyl methacrylate, and 2 parts by mass of acrylic acid. Next, a 6.5-part by mass portion of the resulting pre-emulsion was added to the flask, the contents were heated to 80° C. under stirring while nitrogen gas was gently blown into the flask, and 2 parts by mass of a 5% aqueous solution of ammonium persulfate was added to initiate polymerization. Subsequently, the rest of the resulting pre-emulsion (123.5 parts by mass), 6 parts by mass of a 5% aqueous solution of ammonium persulfate, and 6 parts by mass of a 2.5% aqueous solution of sodium hydrogen sulfite were uniformly added dropwise to the flask over two hours. After the dropwise addition, the temperature was further maintained at 80° C. for two hours, and 25% ammonia water was added so that the pH reached about 8. Thereafter, the reaction solution was cooled to room temperature. Thus, an aqueous dispersion of a (meth)acrylic based copolymer having a nonvolatile content of 48.2%, a pH of 7.8, and a volume average particle size of 190 nm.

Preparation Example 2

A flask equipped with a dropping funnel, a stirrer, a nitrogen inlet tube, a thermometer, and a reflux condenser was charged with 64 parts by mass of deionized water. Separately, in the dropping funnel, a pre-emulsion was prepared from 26 parts by mass of deionized water, 4 parts by mass of a 10% aqueous solution of sodium dodecylbenzenesulfonate, 54 parts by mass of methyl methacrylate, 44 parts by mass of dodecyl methacrylate, and 2 parts by mass of acrylic acid. Next, a 6.5-part by mass portion of the resulting pre-emulsion was added to the flask, the contents were heated to 80° C. under stirring while nitrogen gas was gently blown into the flask, and 2 parts by mass of a 5% aqueous solution of ammonium persulfate was added to initiate polymerization. Subsequently, the rest of the resulting pre-emulsion (123.5 parts by mass), 6 parts by mass of a 5% aqueous solution of ammonium persulfate, and 6 parts by mass of a 2.5% aqueous solution of sodium hydrogen sulfite were uniformly added dropwise to the flask over two hours. After the dropwise addition, the temperature was further maintained at 80° C. for two hours, and 25% ammonia water was added so that the pH reached about 8. Thereafter, the reaction solution was cooled to room temperature. Thus, an aqueous dispersion of a (meth)acrylic based copolymer having a nonvolatile content of 47.8%, a pH of 7.6, and a volume average particle size of 175 nm was obtained.

Preparation Example 3

A flask equipped with a dropping funnel, a stirrer, a nitrogen inlet tube, a thermometer, and a reflux condenser was charged with 63 parts by mass of deionized water. Separately, in the dropping funnel, a pre-emulsion was prepared from 21 parts by mass of deionized water, 10 parts by mass of a 25% aqueous solution of HITENOL LA-10, 1.5 parts by mass of 1,6-hexanediol dimethacrylate, 21 parts by mass of methyl methacrylate, 76 parts by mass of 2-ethylhexyl methacrylate, and 1.5 parts by mass of acrylic acid. Next, a 6.5-part by mass portion of the resulting pre-emulsion was added to the flask, the contents were heated to 80° C. under stirring while nitrogen gas was gently blown into the flask, and 2 parts by mass of a 5% aqueous solution of ammonium persulfate was added to initiate polymerization. Subsequently, the rest of the resulting pre-emulsion (124.5 parts by mass), 6 parts by mass of a 5% aqueous solution of ammonium persulfate, and 6 parts by mass of a 2.5% aqueous solution of sodium hydrogen sulfite were uniformly added dropwise to the flask over two hours. After the dropwise addition, the temperature was further maintained at 80° C. for two hours, and 25% ammonia water was added so that the pH reached about 8. Thereafter, the reaction solution was cooled to room temperature. Thus, an aqueous dispersion of a (meth)acrylic based copolymer having a nonvolatile content of 47.7%, a pH of 7.9, and a volume average particle size of 200 nm was obtained.

Preparation Example 4

A flask equipped with a dropping funnel, a stirrer, a nitrogen inlet tube, a thermometer, and a reflux condenser was charged with 64 parts by mass of deionized water. Separately, in the dropping funnel, a pre-emulsion was prepared from 26 parts by mass of deionized water, 4 parts by mass of a 10% aqueous solution of sodium dodecylbenzenesulfonate, 1.5 parts by mass of 1,6-hexanediol dimethacrylate, 56.5 parts by mass of methyl methacrylate, 41 parts by mass of dodecyl methacrylate, 1 part by mass of methacrylic acid. Next, a 6.5-part by mass portion of the resulting pre-emulsion was added to the flask, the contents were heated to 80° C. under stirring while nitrogen gas was gently blown into the flask, and 2 parts by mass of a 5% aqueous solution of ammonium persulfate was added to initiate polymerization. Subsequently, the rest of the resulting pre-emulsion (123.5 parts by mass), 6 parts by mass of a 5% aqueous solution of ammonium persulfate, and 6 parts by mass of a 2.5% aqueous solution of sodium hydrogen sulfite were uniformly added dropwise to the flask over two hours. After the dropwise addition, the temperature was further maintained at 80° C. for two hours, and 25% ammonia water was added so that the pH reached about 8. Thereafter, the reaction solution was cooled to room temperature. Thus, an aqueous dispersion of a (meth)acrylic based copolymer having a nonvolatile content of 48.0%, a pH of 8.1, and a volume average particle size of 220 nm was obtained.

Preparation Example 5

A flask equipped with a dropping funnel, a stirrer, a nitrogen inlet tube, a thermometer, and a reflux condenser was charged with 59 parts by mass of deionized water. Separately, in the dropping funnel, a pre-emulsion (1) was prepared from 10.5 parts by mass of deionized water, 6 parts by mass of a 25% aqueous solution of HITENOL NF-08 (produced by Dai-Ichi Kogyo Seiyaku Co., Ltd.), 18 parts by mass of 2-ethylhexyl acrylate, 31 parts by mass of n-butyl methacrylate, and 1 part by mass of acrylic acid. Next, a 6.5-part by mass portion of the resulting pre-emulsion (1) was added to the flask, the contents were heated to 80° C. while nitrogen gas was gently blown, and 1 part by mass of a 5% aqueous solution of ammonium persulfate was added to initiate polymerization. Subsequently, the rest of the pre-emulsion (1) (60 parts by mass), 3 parts by mass of 5% ammonium persulfate, and 3 parts by mass of a 2.5% aqueous solution of sodium hydrogen sulfite were uniformly added dropwise over two hours.

After the dropwise addition, the temperature was further maintained at 80° C. for one hour. Subsequently, a pre-emulsion (2) containing 10.5 parts by mass of deionized water, 6 parts by mass of a 25% aqueous solution of HITENOL NF-08 (produced by Dai-Ichi Kogyo Seiyaku Co., Ltd.), 18 parts by mass of 2-ethylhexyl acrylate, 30 parts by mass of n-butyl methacrylate, and 2 parts by mass of acrylic acid; 3 parts by mass of a 5% aqueous solution of ammonium persulfate; and 3 parts by mass of a 2.5% aqueous solution of sodium hydrogen sulfite were uniformly added dropwise over two hours.

After the dropwise addition, the temperature was further maintained at 80° C. for two hours, and 25% ammonia water was added so that the pH reached about 8. Thereafter, the reaction solution was cooled to room temperature. Thus, an aqueous dispersion of a (meth)acrylic based copolymer having a nonvolatile content of 48.1%, a pH of 7.6, and a volume average particle size of 180 nm was obtained.

Preparation Example 6

A flask equipped with a dropping funnel, a stirrer, a nitrogen inlet tube, a thermometer, and a reflux condenser was charged with 64 parts by mass of deionized water. Separately, in the dropping funnel, a pre-emulsion was prepared from 21 parts by mass of deionized water, 10 parts by mass of a 25% aqueous solution of HITENOL LA-10, 1.5 parts by mass of 1,6-hexanediol dimethacrylate, 53 parts by mass of methyl methacrylate, 44 parts by mass of 2-ethylhexyl acrylate, and 1.5 parts by mass of acrylic acid. Next, a 6.5-part by mass portion of the resulting pre-emulsion was added to the flask, the contents were heated to 80° C. under stirring while nitrogen gas was gently blown into the flask, and 2 parts by mass of a 5% aqueous solution of ammonium persulfate was added to initiate polymerization. Subsequently, the rest of the resulting pre-emulsion (124.5 parts by mass), 6 parts by mass of a 5% aqueous solution of ammonium persulfate, and 6 parts by mass of a 2.5% aqueous solution of sodium hydrogen sulfite were uniformly added dropwise to the flask over two hours. After the dropwise addition, the temperature was further maintained at 80° C. for two hours, and 25% ammonia water was added so that the pH reached about 8. Thereafter, the reaction solution was cooled to room temperature. Thus, an aqueous dispersion of a (meth)acrylic based copolymer having a nonvolatile content of 48.3%, a pH of 7.8, and a volume average particle size of 190 nm was obtained.

Preparation Example 7

A flask equipped with a dropping funnel, a stirrer, a nitrogen inlet tube, a thermometer, and a reflux condenser was charged with 59 parts by mass of deionized water. Separately, in the dropping funnel, a pre-emulsion (1) was prepared from 10.5 parts by mass of deionized water, 6 parts by mass of a 25% aqueous solution of HITENOL NF-08 (produced by Dai-Ichi Kogyo Seiyaku Co., Ltd.), 1 part by mass of 1,6-hexanediol dimethacrylate, 10 parts by mass of methyl methacrylate, 23 parts by mass of dodecyl methacrylate, 5 parts by mass of styrene, 10 parts by mass of n-butyl methacrylate, and 1 part by mass of acrylic acid. Next, a 6.5-part by mass portion of the resulting pre-emulsion (1) was added to the flask, the contents were heated to 80° C. while nitrogen gas was gently blown, and 1 part by mass of a 5% aqueous solution of ammonium persulfate was added to initiate polymerization. Subsequently, the rest of the pre-emulsion (1) (60 parts by mass), 3 parts by mass of 5% ammonium persulfate, and 3 parts by mass of a 2.5% aqueous solution of sodium hydrogen sulfite were uniformly added dropwise over two hours.

After the dropwise addition, the temperature was further maintained at 80° C. for one hour. Subsequently, a pre-emulsion (2) containing 10.5 parts by mass of deionized water, 6 parts by mass of a 25% aqueous solution of HITENOL NF-08 (produced by Dai-Ichi Kogyo Seiyaku Co., Ltd.), 0.5 parts by mass of 1,6-hexanediol dimethacrylate, 10 parts by mass of methyl methacrylate, 23 parts by mass of dodecyl methacrylate, 15 parts by mass of styrene, 1 part by mass of itaconic acid, and 0.5 parts by mass of acrylic acid; 3 parts by mass of a 5% aqueous solution of ammonium persulfate; and 3 parts by mass of a 2.5% aqueous solution of sodium hydrogen sulfite were uniformly added dropwise over two hours.

After the dropwise addition, the temperature was further maintained at 80° C. for two hours, and 25% ammonia water was added so that the pH reached about 8. Thereafter, the reaction solution was cooled to room temperature. Thus, an aqueous dispersion of a (meth)acrylic based copolymer having a nonvolatile content of 48.1%, a pH of 7.7, and a volume average particle size of 185 nm was obtained.

Preparation Example 8

A flask equipped with a dropping funnel, a stirrer, a nitrogen inlet tube, a thermometer, and a reflux condenser was charged with 64 parts by mass of deionized water. Separately, in the dropping funnel, a pre-emulsion was prepared from 26 parts by mass of deionized water, 4 parts by mass of a 10% aqueous solution of sodium dodecylbenzenesulfonate, 24 parts by mass of methyl methacrylate, 43.5 parts by mass of dodecyl methacrylate, 30 parts by mass of styrene, 1 part by mass of itaconic acid, and 1.5 parts by mass of acrylic acid. Next, a 6.5-part by mass portion of the resulting pre-emulsion was added to the flask, the contents were heated to 80° C. under stirring while nitrogen gas was gently blown into the flask, and 2 parts by mass of a 5% aqueous solution of ammonium persulfate was added to initiate polymerization. Subsequently, the rest of the resulting pre-emulsion (123.5 parts by mass), 6 parts by mass of a 5% aqueous solution of ammonium persulfate, and 6 parts by mass of a 2.5% aqueous solution of sodium hydrogen sulfite were uniformly added dropwise to the flask over two hours. After the dropwise addition, the temperature was further maintained at 80° C. for two hours, and 25% ammonia water was added so that the pH reached about 8. Thereafter, the reaction solution was cooled to room temperature. Thus, an aqueous dispersion of a (meth)acrylic based copolymer having a nonvolatile content of 48.2%, a pH of 7.6, and a volume average particle size of 185 nm was obtained.

1. Examples of the First Aspect of the Invention

Example 1-1

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 48%), an aqueous dispersion of polytetrafluoroethylene (trade name: POLYFLON D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 100:100:5:3:15. The kneaded mixture was roll-pressed to prepare a 100-μm-thick anion conducting membrane. The membrane-forming properties were evaluated as 3 based on the above criteria.

The resulting anion conducting membrane had an air permeance (T) of 30,000 s, a piercing strength (F) of 3.3 N, a density (ρ) of 1.54 g/cm$^3$, and a thickness (L) of 100 μm. The X value determined from these values was 228,690.

Further, the resulting anion conducting membrane had a liquid absorption rate of 18% and a degree of swelling of 9%.

The cross-section of the resulting anion conducting membrane observed with a scanning electron microscope was shown in FIG. 1. The ratio of the combined area of the hydrotalcite particles to the combined area of the other components in the cross-section of the resulting anion conducting membrane was 54/46, and the proportion of the voids was 0.00%. The hydrotalcite particles in the anion conducting membrane had a cross-sectional particle size of 0.36 μm.

Figure 3:
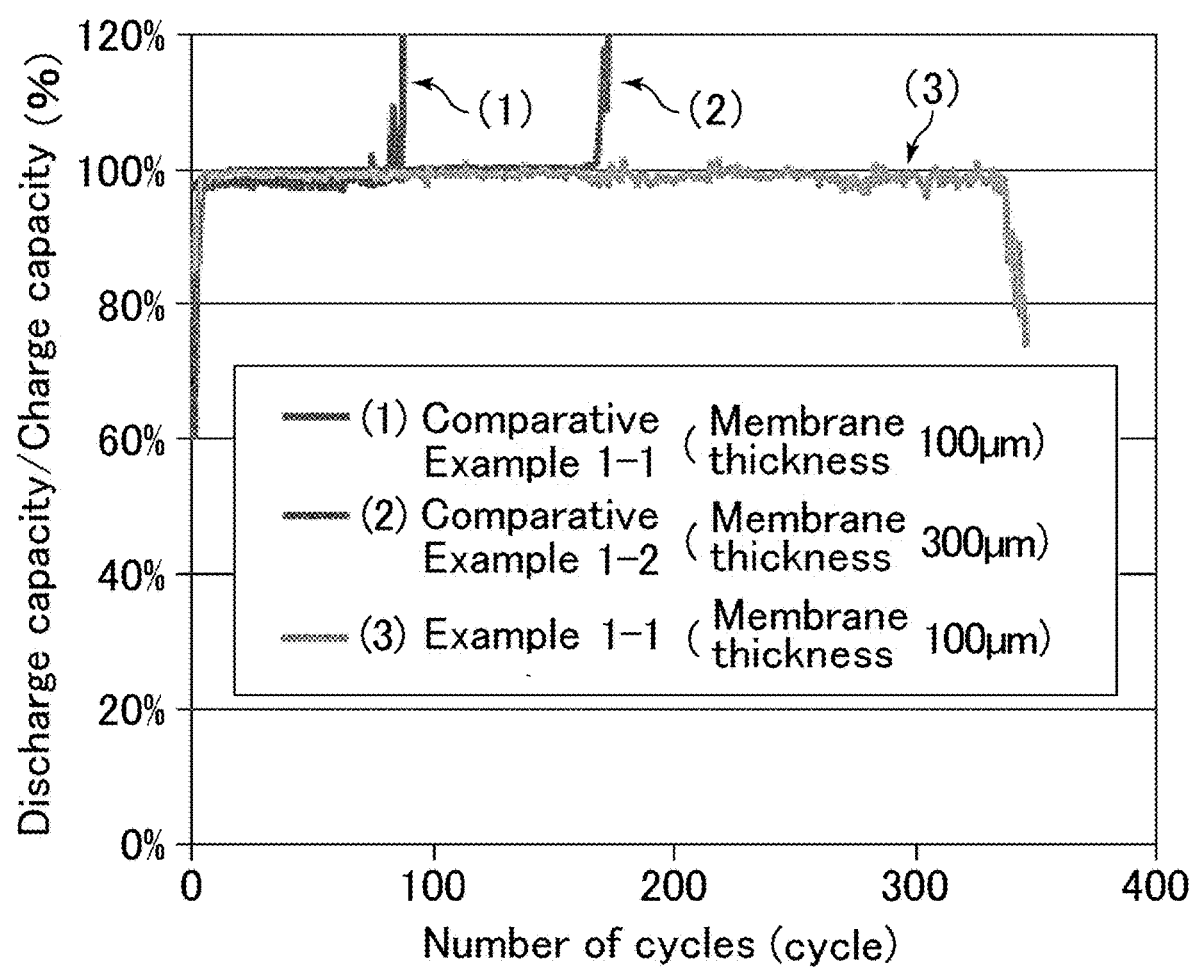
FIG. 3 is a graph showing the results of charge and discharge evaluation in Example 1-1 and Comparative Examples 1-1 and 1-2.

The resulting anion conducting membrane had a resistance (R) of 0.23Ω, and achieved 310 cycles of charge and discharge in charge-discharge evaluation. FIG. 3 shows the results of the charge-discharge evaluation.

Example 1-2

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 48%), an aqueous dispersion of polytetrafluoroethylene (trade name: D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 100:100:5:3:15. The kneaded mixture was roll-pressed to prepare a 300-μm-thick anion conducting membrane. The membrane-forming properties were evaluated as 3 based on the above criteria.

The resulting anion conducting membrane had an air permeance (T) of 30,000 s, a piercing strength (F) of 4.3 N, a density (ρ) of 1.51 g/cm$^3$, and a thickness (L) of 300 μm. The X value determined from these values was 97,395.

Further, the resulting anion conducting membrane had a liquid absorption rate of 20% and a degree of swelling of 11%.

The ratio of the combined area of the hydrotalcite particles to the combined area of the other components in the cross-section of the resulting anion conducting membrane was 55/45, and the proportion of the voids was 0.2% or less. The hydrotalcite particles in the anion conducting membrane had a cross-sectional particle size of 0.39 μm.

The resulting anion conducting membrane had a resistance (R) of 0.64Ω, and achieved 700 cycles of charge and discharge in charge-discharge evaluation.

Example 1-3

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 48%), an aqueous dispersion of polytetrafluoroethylene (trade name: D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 65:135:5:3:15. The kneaded mixture was roll-pressed to prepare a 100-μm-thick anion conducting membrane. The membrane-forming properties were evaluated as 1 based on the above criteria.

The resulting anion conducting membrane had an air permeance (T) of 30,000 s, a piercing strength (F) of 3.1 N, a density (ρ) of 1.35 g/cm$^3$, and a thickness (L) of 100 μm. The X value determined from these values was 188,325.

Further, the resulting anion conducting membrane had a liquid absorption rate of 17% and a degree of swelling of 11%.

The ratio of the combined area of the hydrotalcite particles to the combined area of the other components in the cross-section of the resulting anion conducting membrane was 33/67, and the proportion of the voids was 0%. The hydrotalcite particles in the anion conducting membrane had a cross-sectional particle size of 0.42 µm.

The resulting anion conducting membrane had a resistance (R) of 0.22Ω, and achieved 250 cycles of charge and discharge in charge-discharge evaluation.

Example 1-4

Hydrotalcite (trade name: DHT-6 produced by Kyowa Chemical Industry Co., Ltd., average particle size: 0.20 µm), an aqueous dispersion of a styrene-butadiene based copolymer (product name: TRD2001 produced by JSR Corporation, Tg=−2° C., solid content: 48%), an aqueous dispersion of polytetrafluoroethylene (trade name: D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 135:65:5:3:15. The kneaded mixture was roll-pressed to prepare a 100-µm-thick anion conducting membrane. The membrane-forming properties were evaluated as 1 based on the above criteria.

The anion conducting membrane had an air permeance (T) of 30,000 s, a piercing strength (F) of 2.7 N, a density (ρ) of 1.68 g/cm$^3$, and a thickness (L) of 100 µm. The X value determined from these values was 204,120.

Further, the resulting anion conducting membrane had a liquid absorption rate of 15% and a degree of swelling of 9%.

The ratio of the combined area of the hydrotalcite particles to the combined area of the other components in the cross-section of the resulting anion conducting membrane was 69/31, and the proportion of the voids was 0.5%. The hydrotalcite particles in the anion conducting membrane had a cross-sectional particle size of 0.30 µm.

The resulting anion conducting membrane had a resistance (R) of 0.20Ω, and achieved 260 cycles of charge and discharge in charge-discharge evaluation.

Example 1-5

Hydrotalcite (trade name: DHT-6 produced by Kyowa Chemical Industry Co., Ltd., average particle size: 0.20 µm), an aqueous dispersion of a styrene-butadiene based copolymer (product name: TRD102A, produced by JSR Corporation, Tg=−5° C., solid content: 48%), an aqueous dispersion of polytetrafluoroethylene (trade name: D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 100:100:5:3:15. The kneaded mixture was roll-pressed to prepare a 100-µm-thick anion conducting membrane. The membrane-forming properties were evaluated as 3 based on the above criteria.

The resulting anion conducting membrane had an air permeance (T) of 30,000 s, a piercing strength (F) of 2.7 N, a density (ρ) of 1.51 g/cm$^3$, and a thickness (L) of 100 µm. The X value determined from these values was 183,465.

Further, the resulting anion conducting membrane had a liquid absorption rate of 16% and a degree of swelling of 9%.

The ratio of the combined area of the hydrotalcite particles to the combined area of the other components in the cross-section of the resulting anion conducting membrane was 52/48, and the proportion of the voids was 0.1%. The hydrotalcite particles in the anion conducting membrane had a cross-sectional particle size of 0.34 µm.

The resulting anion conducting membrane had a resistance (R) of 0.23Ω, and achieved 300 cycles of charge and discharge in charge-discharge evaluation.

Example 1-6

Hydrotalcite (trade name: DHT-6 produced by Kyowa Chemical Industry Co., Ltd., average particle size: 0.20 µm), an aqueous dispersion of a styrene-butadiene based copolymer (product name: TRD104A produced by JSR Corporation, Tg=7° C., solid content: 48%), an aqueous dispersion of polytetrafluoroethylene (trade name: D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 100:100:5:3:20. The kneaded mixture was roll-pressed to prepare a 100-µm-thick anion conducting membrane. The membrane-forming properties were evaluated as 2 based on the above criteria.

The resulting anion conducting membrane had an air permeance (T) of 30,000 s, a piercing strength (F) of 2.8 N, a density (ρ) of 1.49 g/cm$^3$, and a thickness (L) of 100 µm. The X value determined from these values was 187,740.

Further, the resulting anion conducting membrane had a liquid absorption rate of 15% and a degree of swelling of 9%.

The ratio of the combined area of the hydrotalcite particles to the combined area of the other components in the cross-section of the resulting anion conducting membrane was 53/47, and the proportion of the voids was 0.1%. The hydrotalcite particles in the anion conducting membrane had a cross-sectional particle size of 0.37 µm.

The resulting anion conducting membrane had a resistance (R) of 0.2Ω, and achieved 300 cycles of charge and discharge in charge-discharge evaluation.

Example 1-7

Hydrotalcite (trade name: DHT-6 produced by Kyowa Chemical Industry Co., Ltd., average particle size: 0.20 µm) and an aqueous dispersion of a styrene-butadiene based copolymer (product name: TRD2001 produced by JSR Corporation, Tg=−2° C., solid content: 48%) were kneaded with a kneader at a ratio by mass of 100:100. The kneaded mixture was roll-pressed to prepare a 100-µm-thick anion conducting membrane. The membrane-forming properties were evaluated as 1 based on the above criteria.

The anion conducting membrane had an air permeance (T) of 30,000 s, a piercing strength (F) of 3.2 N, a density (ρ) of 1.53 g/cm$^3$, and a thickness (L) of 100 µm. The X value determined from these values was 220,320.

Further, the resulting anion conducting membrane had a liquid absorption rate of 18% and a degree of swelling of 11%.

The ratio of the combined area of the hydrotalcite particles to the combined area of the other components in the cross-section of the resulting anion conducting membrane was 54/46, and the proportion of the voids was 0.2% relative to the total area of the cross-section of the membrane. The hydrotalcite particles in the anion conducting membrane had a cross-sectional particle size of 0.39 µm.

The resulting anion conducting membrane had a resistance (R) of 0.25Ω, and achieved 290 cycles of charge and discharge in charge-discharge evaluation.

Example 1-8

Hydrotalcite (trade name: DHT-6 produced by Kyowa Chemical Industry Co., Ltd., average particle size: 0.20 μm), an aqueous dispersion of a styrene-butadiene based copolymer (product name: TRD1002 produced by JSR Corporation, Tg=−20° C., solid content: 50%), an aqueous dispersion of polytetrafluoroethylene (trade name: D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 100:100:5:3:15. The kneaded mixture was roll-pressed to prepare a 100-μm-thick anion conducting membrane. The membrane-forming properties were evaluated as 1 based on the above criteria.

The resulting anion conducting membrane had an air permeance (T) of 30,000 s, a piercing strength (F) of 3.1 N, a density ($\rho$) of 1.52 g/cm$^3$, and a thickness (L) of 100 μm. The X value determined from these values was 212,040.

Further, the resulting anion conducting membrane had a liquid absorption rate of 18% and a degree of swelling of 11%.

The ratio of the combined area of the hydrotalcite particles to the combined area of the other components in the cross-section of the resulting anion conducting membrane was 52/48, and the proportion of the voids was 0.1%. The hydrotalcite particles in the anion conducting membrane had a cross-sectional particle size of 0.39 μm.

The resulting anion conducting membrane had a resistance (R) of 0.20Ω, and achieved 300 cycles of charge and discharge in charge-discharge evaluation.

Example 1-9

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 50%), an aqueous dispersion of polytetrafluoroethylene (trade name: D210C produced by Daikin Industries, Ltd., solid content: 60%), and pure water were kneaded with a kneader at a ratio by mass of 100:100:5:15. The kneaded mixture was roll-pressed to prepare a 100-μm-thick anion conducting membrane. The membrane-forming properties were evaluated as 1 based on the above criteria.

Further, the resulting anion conducting membrane had an air permeance (T) of 30,000 s, a piercing strength (F) of 3.0 N, a density ($\rho$) of 1.53 g/cm$^3$, and a thickness (L) of 100 μm. The X value determined from these values was 206,550.

The resulting anion conducting membrane had a liquid absorption rate of 17% and a degree of swelling of 9%.

The ratio of the combined area of the hydrotalcite particles to the combined area of the other components in the cross-section of the resulting anion conducting membrane was 55/45, and the proportion of the voids was 0.5%. The hydrotalcite particles in the anion conducting membrane had a cross-sectional particle size of 0.42 μm.

The resulting anion conducting membrane had a resistance (R) of 0.21Ω, and achieved 280 cycles of charge and discharge in charge-discharge evaluation.

Example 1-10

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 50%), carboxymethylcellulose (trade name: DAICEL 1380 produced by Daicel FineChem Ltd.), and pure water were kneaded with a kneader at a ratio by mass of 100:100:3:15. The kneaded mixture was roll-pressed to prepare a 100-μm-thick anion conducting membrane. The membrane-forming properties were evaluated as 2 based on the above criteria.

The resulting anion conducting membrane had an air permeance (T) of 30,000 s, a piercing strength (F) of 2.7 N, a density ($\rho$) of 1.53 g/cm$^3$, and a thickness (L) of 100 μm. The X value determined from these values was 185,895.

Further, the resulting anion conducting membrane had a liquid absorption rate of 18% and a degree of swelling of 10%.

The ratio of the combined area of the hydrotalcite particles to the combined area of the other components in the cross-section of the resulting anion conducting membrane was 51/49, and the proportion of the voids was 0.7%. The hydrotalcite particles in the anion conducting membrane had a cross-sectional particle size of 0.40 μm.

The resulting anion conducting membrane had a resistance (R) of 0.22Ω, and achieved 270 cycles of charge and discharge in charge-discharge evaluation.

Example 1-11

An amount of 100 parts by mass of hydrotalcite (trade name: DHT-6 produced by Kyowa Chemical Industry Co., Ltd., average particle size: 0.20 μm), 100 parts by mass of an aqueous dispersion of the (meth)acrylic based copolymer obtained in Preparation Example 1, 3 parts by mass of carboxymethylcellulose (trade name: DAICEL 1380 produced by Daicel FineChem Ltd.), and 10 parts by mass of pure water were kneaded with a kneader to prepare a uniform kneaded mixture. The resulting kneaded mixture was roll-pressed to a thickness of 100 μm, and heated at 120° C. for 10 minutes. Thus, an anion conducting membrane was obtained. The membrane-forming properties were evaluated as 3 based on the above criteria.

The resulting anion conducting membrane had an air permeance (T) of 30,000 s, a piercing strength (F) of 1.9 N, a density ($\rho$) of 1.50 g/cm$^3$, and a thickness (L) of 99 μm. The X value determined from these values was 129,545.

Further, the resulting anion conducting membrane had a liquid absorption rate of 11% and a degree of swelling of 4%.

The ratio of the combined area of the hydrotalcite particles to the combined area of the other components in the cross-section of the resulting anion conducting membrane was 54/46, and the proportion of the voids was 0.2%. The hydrotalcite particles in the anion conducting membrane had a cross-sectional particle size of 0.37 μm.

The resulting anion conducting membrane had a resistance (R) of 0.22Ω, and achieved 400 cycles in charge-discharge evaluation.

Example 1-12

An anion conducting membrane was obtained in the same manner as in Example 1-11, except that an aqueous dispersion of the (meth)acrylic based copolymer obtained in Preparation Example 2 was used instead of the aqueous dispersion of the (meth)acrylic based copolymer obtained in Preparation Example 1 in Example 1-11. The membrane-forming properties were evaluated as 2 based on the above criteria.

The resulting anion conducting membrane had an air permeance (T) of 30,000 s, a piercing strength (F) of 2.7 N, a density (ρ) of 1.53 g/cm³, and a thickness (L) of 102 μm. The X value determined from these values was 182,250.

Further, the resulting anion conducting membrane had a liquid absorption rate of 13% and a degree of swelling of 3%.

The ratio of the combined area of the hydrotalcite particles to the combined area of the other components in the cross-section of the resulting anion conducting membrane was 55/45, and the proportion of the voids was 0.1%. The hydrotalcite particles in the anion conducting membrane had a cross-sectional particle size of 0.34 μm.

The resulting anion conducting membrane had a resistance (R) of 0.22Ω, and achieved 400 cycles in charge-discharge evaluation.

Example 1-13

An anion conducting membrane was obtained in the same manner as in Example 1-11, except that an aqueous dispersion of the (meth)acrylic based copolymer obtained in Preparation Example 3 was used instead of the aqueous dispersion of the (meth)acrylic based copolymer obtained in Preparation Example 1 in Example 1-11. The membrane-forming properties were evaluated as 2 based on the above criteria.

The resulting anion conducting membrane had an air permeance (T) of 30,000 s, a piercing strength (F) of 2.5 N, a density (ρ) of 1.51 g/cm³, and a thickness (L) of 103 μm. The X value determined from these values was 164,927.

Further, the resulting anion conducting membrane had a liquid absorption rate of 13% and a degree of swelling of 4%.

The ratio of the combined area of the hydrotalcite particles to the combined area of the other components in the cross-section of the resulting anion conducting membrane was 56/44, and the proportion of the voids was 0.1%. The hydrotalcite particles in the anion conducting membrane had a cross-sectional particle size of 0.34 μm.

The resulting anion conducting membrane had a resistance (R) of 0.21Ω, and achieved 350 cycles in charge-discharge evaluation.

Example 1-14

An anion conducting membrane was obtained in the same manner as in Example 1-11, except that an aqueous dispersion of the (meth)acrylic based copolymer obtained in Preparation Example 4 was used instead of the aqueous dispersion of the (meth)acrylic based copolymer obtained in Preparation Example 1 in Example 1-11. The membrane-forming properties were evaluated as 2 based on the above criteria.

The resulting anion conducting membrane had an air permeance (T) of 30,000 s, a piercing strength (F) of 1.7 N, a density (ρ) of 1.50 g/cm³, and a thickness (L) of 98 μm. The X value determined from these values was 117,092.

Further, the resulting anion conducting membrane had a liquid absorption rate of 12% and a degree of swelling of 3%.

The ratio of the combined area of the hydrotalcite particles to the combined area of the other components in the cross-section of the resulting anion conducting membrane was 56/44, and the proportion of the voids was 0.1%. The hydrotalcite particles in the anion conducting membrane had a cross-sectional particle size of 0.34 μm.

The resulting anion conducting membrane had a resistance (R) of 0.23Ω, and achieved 360 cycles in charge-discharge evaluation.

Example 1-15

An anion conducting membrane was obtained in the same manner as in Example 1-11, except that an aqueous dispersion of the (meth)acrylic based copolymer obtained in Preparation Example 5 was used instead of the aqueous dispersion of the (meth)acrylic based copolymer obtained in Preparation Example 1 in Example 1-11. The membrane-forming properties were evaluated as 1 based on the above criteria.

The resulting anion conducting membrane had an air permeance (T) of 30,000 s, a piercing strength (F) of 1.9 N, a density (ρ) of 1.52 g/cm³, and a thickness (L) of 99 μm. The X value determined from these values was 131,273.

Further, the resulting anion conducting membrane had a liquid absorption rate of 13% and a degree of swelling of 5%.

The ratio of the combined area of the hydrotalcite particles to the combined area of the other components in the cross-section of the resulting anion conducting membrane was 55/45, and the proportion of the voids was 0.2%. The hydrotalcite particles in the anion conducting membrane had a cross-sectional particle size of 0.37 μm.

The resulting anion conducting membrane had a resistance (R) of 0.21Ω, and achieved 330 cycles in charge-discharge evaluation.

Example 1-16

An anion conducting membrane was obtained in the same manner as in Example 1-11, except that an aqueous dispersion of the (meth)acrylic based copolymer obtained in Preparation Example 6 was used instead of the aqueous dispersion of the (meth)acrylic based copolymer obtained in Preparation Example 1 in Example 1-11. The membrane-forming properties were evaluated as 3 based on the above criteria.

The resulting anion conducting membrane had an air permeance (T) of 30,000 s, a piercing strength (F) of 1.9 N, a density (ρ) of 1.5 g/cm³, and a thickness (L) of 103 μm. The X value determined from these values was 124,515.

Further, the resulting anion conducting membrane had a liquid absorption rate of 13% and a degree of swelling of 5%.

The ratio of the combined area of the hydrotalcite particles to the combined area of the other components in the cross-section of the resulting anion conducting membrane was 55/45, and the proportion of the voids was 0.2%. The hydrotalcite particles in the anion conducting membrane had a cross-sectional particle size of 0.33 μm.

The resulting anion conducting membrane had a resistance (R) of 0.21Ω, and achieved 330 cycles in charge-discharge evaluation.

Example 1-17

An anion conducting membrane was obtained in the same manner as in Example 1-11, except that an aqueous dispersion of the (meth)acrylic based copolymer obtained in Preparation Example 7 was used instead of the aqueous dispersion of the (meth)acrylic based copolymer obtained in Preparation Example 1 in Example 1-11. The membrane-forming properties were evaluated as 2 based on the above criteria.

The resulting anion conducting membrane had an air permeance (T) of 30,000 s, a piercing strength (F) of 2.8 N, a density ($\rho$) of 1.51 g/cm$^3$, and a thickness (L) of 101 μm. The X value determined from these values was 188,376.

Further, the resulting anion conducting membrane had a liquid absorption rate of 12% and a degree of swelling of 3%.

The ratio of the combined area of the hydrotalcite particles to the combined area of the other components in the cross-section of the resulting anion conducting membrane was 55/45, and the proportion of the voids was 0.2%. The hydrotalcite particles in the anion conducting membrane had a cross-sectional particle size of 0.35 μm.

The resulting anion conducting membrane had a resistance (R) of 0.23Ω, and achieved 380 cycles in charge-discharge evaluation.

Example 1-18

An anion conducting membrane was obtained in the same manner as in Example 1-11, except that an aqueous dispersion of the (meth)acrylic based copolymer obtained in Preparation Example 8 was used instead of the aqueous dispersion of the (meth)acrylic based copolymer obtained in Preparation Example 1 in Example 1-11. The membrane-forming properties were evaluated as 1 based on the above criteria.

The resulting anion conducting membrane had an air permeance (T) of 30,000 s, a piercing strength (F) of 2.5 N, a density ($\rho$) of 1.49 g/cm$^3$, and a thickness (L) of 99 μm. The X value determined from these values was 169,318.

Further, the resulting anion conducting membrane had a liquid absorption rate of 16% and a degree of swelling of 7%.

The ratio of the combined area of the hydrotalcite particles to the combined area of the other components in the cross-section of the resulting anion conducting membrane was 55/45, and the proportion of the voids was 0.1%. The hydrotalcite particles in the anion conducting membrane had a cross-sectional particle size of 0.38 μm.

The resulting anion conducting membrane had a resistance (R) of 0.20Ω, and achieved 400 cycles in charge-discharge evaluation.

Example 1-19

An amount of 135 parts by mass of hydrotalcite (trade name: DHT-6 produced by Kyowa Chemical Industry Co., Ltd., average particle size: 0.20 μm), 65 parts by mass of an aqueous dispersion of the (meth)acrylic based copolymer obtained in Preparation Example 1, 3 parts by mass of carboxymethylcellulose (trade name: DAICEL 1380 produced by Daicel FineChem Ltd.), and 15 parts by mass of pure water were kneaded with a kneader to prepare a uniform kneaded mixture. The resulting kneaded mixture was roll-pressed to a thickness of 100 μm, and heated 120° C. for 10 minutes. Thus, an anion conducting membrane was obtained. The membrane-forming properties were evaluated as 1 based on the above criteria.

The resulting anion conducting membrane had an air permeance (T) of 30,000 s, a piercing strength (F) of 1.5 N, a density ($\rho$) of 1.67 g/cm$^3$, and a thickness (L) of 103 μm. The X value determined from these values was 109,442.

Further, the resulting anion conducting membrane had a liquid absorption rate of 11% and a degree of swelling of 5%.

The ratio of the combined area of the hydrotalcite particles to the combined area of the other components in the cross-section of the resulting anion conducting membrane was 65/35, and the proportion of the voids was 0.2%. The hydrotalcite particles in the anion conducting membrane had a cross-sectional particle size of 0.37 μm.

The resulting anion conducting membrane had a resistance (R) of 0.20Ω, and achieved 400 cycles in charge-discharge evaluation.

Example 1-20

An amount of 65 parts by mass of hydrotalcite (trade name: DHT-6 produced by Kyowa Chemical Industry Co., Ltd., average particle size: 0.20 μm), 135 parts by mass of an aqueous dispersion of the (meth)acrylic based copolymer obtained in Preparation Example 1, 3 parts by mass of carboxymethylcellulose (trade name: DAICEL 1380 produced by Daicel FineChem Ltd.), and 2 parts by mass of pure water were kneaded with a kneader to prepare a uniform kneaded mixture. The resulting kneaded mixture was roll-pressed to a thickness of 100 μm, and heated 120° C. for 10 minutes. Thus, an anion conducting membrane was obtained. The membrane-forming properties were evaluated as 1 based on the above criteria.

The resulting anion conducting membrane had an air permeance (T) of 30,000 s, a piercing strength (F) of 2.2 N, a density ($\rho$) of 1.34 g/cm$^3$, and a thickness (L) of 102 μm. The X value determined from these values was 130,059.

Further, the resulting anion conducting membrane had a liquid absorption rate of 13% and a degree of swelling of 4%.

The ratio of the combined area of the hydrotalcite particles to the combined area of the other components in the cross-section of the resulting anion conducting membrane was 34/66, and the proportion of the voids was 0.2%. The hydrotalcite particles in the anion conducting membrane had a cross-sectional particle size of 0.38 μm.

The resulting anion conducting membrane had a resistance (R) of 0.20Ω, and achieved 360 cycles in charge-discharge evaluation.

Example 1-21

An amount of 100 parts by mass of hydrotalcite (trade name: DHT-6 produced by Kyowa Chemical Industry Co., Ltd., average particle size: 0.20 μm), 100 parts by mass of an aqueous dispersion of the (meth)acrylic based copolymer obtained in Preparation Example 2, 3 parts by mass of carboxymethylcellulose (trade name: DAICEL 1380 produced by Daicel FineChem Ltd.), and 10 parts by mass of pure water were kneaded with a kneader to prepare a uniform kneaded mixture. The resulting kneaded mixture was roll-pressed to a thickness of 50 μm, and heated 120° C. for 10 minutes. Thus, an anion conducting membrane was obtained. The membrane-forming properties were evaluated as 2 based on the above criteria.

The resulting anion conducting membrane had an air permeance (T) of 30,000 s, a piercing strength (F) of 1.8 N, a density ($\rho$) of 1.54 g/cm$^3$, and a thickness (L) of 52 μm. The X value determined from these values was 239,885.

Further, the resulting anion conducting membrane had a liquid absorption rate of 13% and a degree of swelling of 4%.

The ratio of the combined area of the hydrotalcite particles to the combined area of the other components in the cross-section of the resulting anion conducting membrane was 55/45, and the proportion of the voids was 0.2%. The hydrotalcite particles in the anion conducting membrane had a cross-sectional particle size of 0.34 μm.

The resulting anion conducting membrane had a resistance (R) of 0.10Ω, and achieved 380 cycles in charge-discharge evaluation.

Example 1-22

An amount of 100 parts by mass of hydrotalcite (trade name: DHT-6 produced by Kyowa Chemical Industry Co., Ltd., average particle size: 0.20 μm), 100 parts by mass of an aqueous dispersion of the (meth)acrylic based copolymer obtained in Preparation Example 2, 3 parts by mass of carboxymethylcellulose (trade name: DAICEL 1380 produced by Daicel FineChem Ltd.), and 10 parts by mass of pure water were kneaded with a kneader to prepare a uniform kneaded mixture. The resulting kneaded mixture was roll-pressed to a thickness of 100 μm, and heated 120° C. for 10 minutes. Thus, an anion conducting membrane was obtained. The membrane-forming properties were evaluated as 2 based on the above criteria.

The resulting anion conducting membrane had an air permeance (T) of 30,000 s, a piercing strength (F) of 3.2 N, a density (ρ) of 1.52 g/cm$^3$, and a thickness (L) of 153 μm. The X value determined from these values was 143,059.

Further, the resulting anion conducting membrane had a liquid absorption rate of 14% and a degree of swelling of 3%.

The ratio of the combined area of the hydrotalcite particles to the combined area of the other components in the cross-section of the resulting anion conducting membrane was 55/45, and the proportion of the voids was 0.2%. The hydrotalcite particles in the anion conducting membrane had a cross-sectional particle size of 0.35 μm.

The resulting anion conducting membrane had a resistance (R) of 0.31Ω, and achieved 410 cycles in charge-discharge evaluation.

Example 1-23

An amount of 100 parts by mass of hydrotalcite (trade name: DHT-6 produced by Kyowa Chemical Industry Co., Ltd., average particle size: 0.20 μm), 100 parts by mass of an aqueous dispersion of the (meth)acrylic based copolymer obtained in Preparation Example 3, 3 parts by mass of methyl cellulose (trade name: SM1500 produced by Shin-Etsu Chemical Co., Ltd.), and 10 parts by mass of pure water were kneaded with a kneader to prepare a uniform kneaded mixture. The resulting kneaded mixture was roll-pressed to a thickness of 100 μm, and heated 120° C. for 10 minutes. Thus, an anion conducting membrane was obtained. The membrane-forming properties were evaluated as 2 based on the above criteria.

The resulting anion conducting membrane had an air permeance (T) of 30,000 s, a piercing strength (F) of 2.2 N, a density (ρ) of 1.52 g/cm$^3$, and a thickness (L) of 100 μm. The X value determined from these values was 150,480.

Further, the resulting anion conducting membrane had a liquid absorption rate of 11% and a degree of swelling of 3%.

The ratio of the combined area of the hydrotalcite particles to the combined area of the other components in the cross-section of the resulting anion conducting membrane was 56/44, and the proportion of the voids was 0.3%. The hydrotalcite particles in the anion conducting membrane had a cross-sectional particle size of 0.34 μm.

The resulting anion conducting membrane had a resistance (R) of 0.26Ω, and achieved 400 cycles in charge-discharge evaluation.

Example 1-24

An amount of 100 parts by mass of hydrotalcite (trade name: DHT-6 produced by Kyowa Chemical Industry Co., Ltd., average particle size: 0.20 μm), 100 parts by mass of an aqueous dispersion of an acrylonitrile-butadiene based copolymer (product name: NA-13, produced by A&L, solid content: 47%), 5 parts by mass of an aqueous dispersion of polytetrafluoroethylene (trade name: D210C produced by Daikin Industries, Ltd., solid content: 60%), 3 parts by mass of carboxymethylcellulose (trade name: DAICEL 1380 produced by Daicel FineChem Ltd.), and 15 parts by mass of pure water were kneaded with a kneader to prepare a uniform kneaded mixture. The resulting kneaded mixture was roll-pressed. Thus, a 100-μm-thick anion conducting membrane was obtained. The membrane-forming properties were evaluated as 1 based on the above criteria.

The resulting anion conducting membrane had an air permeance (T) of 30,000 s, a piercing strength (F) of 2.6 N, a density (ρ) of 1.52 g/cm$^3$, and a thickness (L) of 100 μm. The X value determined from these values was 177,840.

Further, the resulting anion conducting membrane had a liquid absorption rate of 19% and a degree of swelling of 11%.

The ratio of the combined area of the hydrotalcite particles to the combined area of the other components in the cross-section of the resulting anion conducting membrane was 52/48, and the proportion of the voids was 0.3%. The hydrotalcite particles in the anion conducting membrane had a cross-sectional particle size of 0.36 μm.

The resulting anion conducting membrane had a resistance (R) of 0.22Ω, and achieved 340 cycles in charge-discharge evaluation.

Example 1-25

An anion conducting membrane was obtained in the same manner as in Example 1-13, except that 5 parts by mass of a polyacrylic acid salt (trade name: AQUALIC DL522 produced by Nippon Shokubai Co., Ltd.) was used instead of 3 parts by mass of the carboxymethylcellulose as in Example 1-13 and the amount of the pure water was changed from 10 parts by mass as in Example 1-13 to 5 parts by mass. The membrane-forming properties were evaluated as 2 based on the above criteria.

The resulting anion conducting membrane had an air permeance (T) of 30,000 s, a piercing strength (F) of 2.1 N, a density (ρ) of 1.51 g/cm$^3$, and a thickness (L) of 100 μm. The X value determined from these values was 142,695.

Further, the resulting anion conducting membrane had a liquid absorption rate of 18% and a degree of swelling of 12%.

The ratio of the combined area of the hydrotalcite particles to the combined area of the other components in the cross-section of the resulting anion conducting membrane was 54/46, and the proportion of the voids was 0.2%. The hydrotalcite particles in the anion conducting membrane had a cross-sectional particle size of 0.34 μm.

The resulting anion conducting membrane had a resistance (R) of 0.19Ω, and achieved 350 cycles in charge-discharge evaluation.

Example 1-26

An amount of 50 parts by mass of hydrotalcite (trade name: DHT-6 produced by Kyowa Chemical Industry Co., Ltd., average particle size: 0.20 μm), 50 parts by mass of an aqueous dispersion of the (meth)acrylic based copolymer obtained in Preparation Example 1, 1 part by mass of carboxymethylcellulose (trade name: DAICEL 1380 produced by Daicel FineChem Ltd.), and 60 parts by mass of pure water were kneaded with a homogenizing disperser to prepare a uniform aqueous slurry of the anion conducting membrane-forming material. The resulting aqueous slurry was applied with an applicator to the silicone-treated surface of a polyethylene terephthalate (PET) film (release film) in which one surface was treated with silicone, and dried at 120° C. for 30 minutes. Thereafter, the resulting coating of the anion conducting membrane-forming material was peeled from the release film. Thus, an anion conducting membrane was obtained. The membrane-forming properties were evaluated as 3 based on the above criteria.

The resulting anion conducting membrane had an air permeance (T) of 30,000 s, a piercing strength (F) of 2.5 N, a density (ρ) of 1.53 g/cm$^3$, and a thickness (L) of 98 μm. The X value determined from these values was 175,638.

Further, the resulting anion conducting membrane had a liquid absorption rate of 12% and a degree of swelling of 5%.

The ratio of the combined area of the hydrotalcite particles to the combined area of the other components in the cross-section of the resulting anion conducting membrane was 52/48, and the proportion of the voids was 0% relative to the total area of the cross-section of the membrane. The hydrotalcite particles in the anion conducting membrane had a cross-sectional particle size of 0.35 μm.

The resulting anion conducting membrane had a resistance (R) of 0.21Ω, and achieved 420 cycles in charge-discharge evaluation.

Example 1-27

An anion conducting membrane was obtained in the same manner as in Example 1-26, except that an aqueous dispersion of a styrene-butadiene based copolymer (product name: TRD2001 produced by JSR Corporation, Tg=−2° C., solid content: 50%) was used instead of the aqueous dispersion of the (meth)acrylic based copolymer in Example 1-26. The membrane-forming properties were evaluated as 3 based on the above criteria.

The resulting anion conducting membrane had an air permeance (T) of 30,000 s, a piercing strength (F) of 2.6 N, a density (ρ) of 1.52 g/cm$^3$, and a thickness (L) of 100 μm. The X value determined from these values was 177,840.

Further, the resulting anion conducting membrane had a liquid absorption rate of 16% and a degree of swelling of 9.5%.

The ratio of the combined area of the hydrotalcite particles to the combined area of the other components in the cross-section of the resulting anion conducting membrane was 52/48, and the proportion of the voids was 0% relative to the total area of the cross-section of the membrane. The hydrotalcite particles in the anion conducting membrane had a cross-sectional particle size of 0.39 μm.

The resulting anion conducting membrane had a resistance (R) of 0.21Ω, and achieved 320 cycles in charge-discharge evaluation.

Comparative Example 1-1

Figure 2:
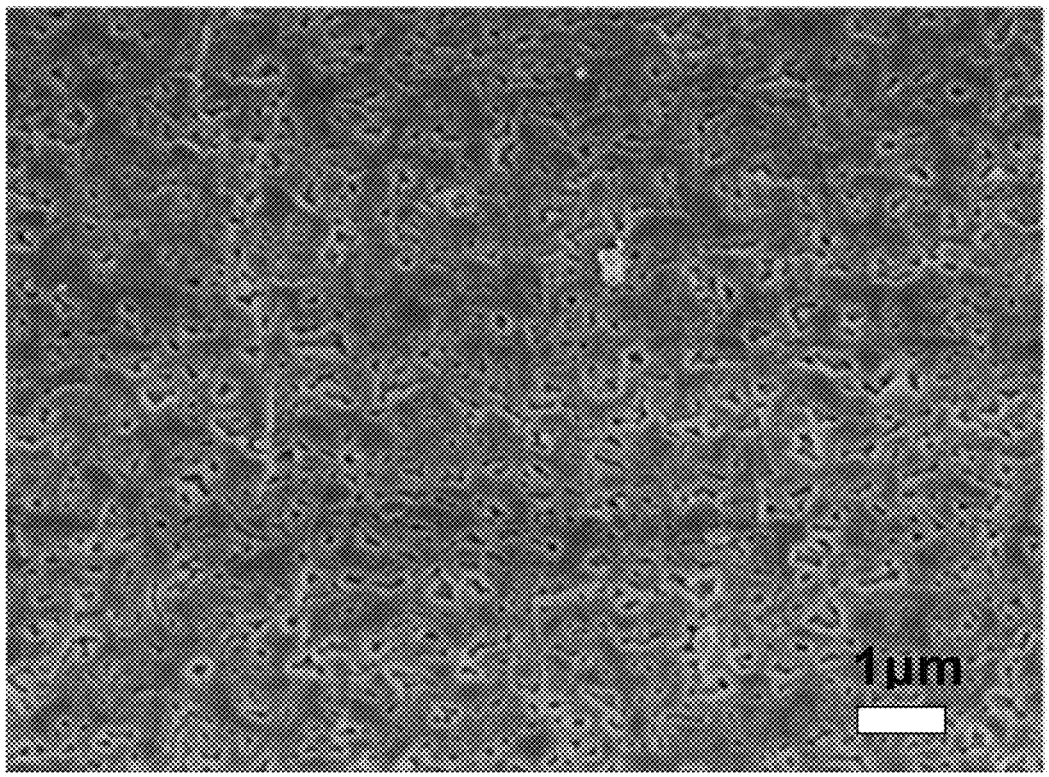
FIG. 2 shows the cross-section of the 100-μm thick membrane prepared in Comparative Example 1-1 observed with a scanning electron microscope.

Hydrotalcite (trade name: DHT-6 produced by Kyowa Chemical Industry Co., Ltd., average particle size: 0.20 μm), an aqueous dispersion of polytetrafluoroethylene (trade name: D210C produced by Daikin Industries, Ltd., solid content: 60%), and pure water were kneaded with a kneader at a ratio by mass of 100:120:50. The kneaded mixture was roll-pressed. Thus, a 100-μm thick membrane was obtained. The cross-section of the resulting membrane observed with a scanning electron microscope was shown in FIG. 2. The membrane-forming properties were evaluated as 3 based on the above criteria.

The resulting anion conducting membrane had an air permeance (T) of 1,000 s, a piercing strength (F) of 0.6 N, a density (ρ) of 1.27 g/cm$^3$, and a thickness (L) of 100 μm. The X value determined from these values was 38.

Further, the resulting anion conducting membrane had a liquid absorption rate of 25% and a degree of swelling of 11%. Further, the proportion of the voids was 4.5%. The hydrotalcite particles in the anion conducting membrane had a cross-sectional particle size of 0.40 μm.

The resulting anion conducting membrane had a resistance (R) of 0.19Ω. In charge-discharge evaluation as in Example 1-1, a short circuit occurred between the positive electrode and the negative electrode due to dendrite growth in the 85th cycle of charge and discharge. FIG. 3 shows the results of the charge-discharge evaluation.

Comparative Example 1-2

Hydrotalcite (trade name: DHT-6 produced by Kyowa Chemical Industry Co., Ltd., average particle size: 0.20 μm), an aqueous dispersion of polytetrafluoroethylene (trade name: D210C produced by Daikin Industries, Ltd., solid content: 60%), and pure water were kneaded with a kneader at a ratio by mass of 100:120:50. The kneaded mixture was roll-pressed. Thus, a 300-μm-thick anion conducting membrane was obtained. The membrane-forming properties were evaluated as 3 based on the above criteria.

The resulting anion conducting membrane had an air permeance (T) of 1,600 s, a piercing strength (F) of 1.3 N, a density (ρ) of 1.29 g/cm$^3$, and a thickness (L) of 300 μm. The X value determined from these values was 72.

Further, the resulting anion conducting membrane had a liquid absorption rate of 23% and a degree of swelling of 15%. Further, the proportion of the voids was 5.1%. The hydrotalcite particles in the anion conducting membrane had a cross-sectional particle size of 0.39 μm.

The resulting anion conducting membrane had a resistance (R) of 0.57Ω. In charge-discharge evaluation as in Example 1-1, a short circuit occurred between the positive electrode and the negative electrode due to dendrite growth in the 165th cycle of charge and discharge. FIG. 3 shows the results of the charge-discharge evaluation.

Comparative Example 1-3

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 48%), an aqueous dispersion of polytetrafluoroethylene (trade name: D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 150:50:5:3:30. The kneaded mixture was roll-pressed. Thus, a 100-μm thick membrane was obtained. The membrane-forming properties were evaluated as 1 based on the above criteria.

The resulting anion conducting membrane had an air permeance (T) of 3,800 s, a piercing strength (F) of 1.4 N, a density (ρ) of 1.59 g/cm$^3$, and a thickness (L) of 100 μm. The X value determined from these values was 1607.

The resulting anion conducting membrane had a liquid absorption rate of 17% and a degree of swelling of 11%.

The ratio of the combined area of the hydrotalcite particles to the combined area of the other components in the cross-section of the resulting anion conducting membrane was 74/26, and the proportion of the voids was 1.4%. The hydrotalcite particles in the anion conducting membrane had a cross-sectional particle size of 0.38 μm.

The resulting anion conducting membrane had a resistance (R) of 0.24Ω, and in charge-discharge evaluation, a short circuit occurred between the positive electrode and the negative electrode due to dendrite growth in the 120th cycle of charge and discharge.

Comparative Example 1-4

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 48%), an aqueous dispersion of polytetrafluoroethylene (trade name: D210C produced by Daikin Industries, Ltd., solid content: 60%), carboxymethylcellulose (trade name: DAICEL 1380 produced by Daicel FineChem Ltd.), and pure water were kneaded with a kneader at a ratio by mass of 50:150:5:3:15. The resulting kneaded mixture was highly fluid, and could not be formed into a membrane. The membrane-forming properties were evaluated as 0 based on the above criteria.

Comparative Example 1-5

Hydrotalcite (trade name: DHT-6 produced by Kyowa Chemical Industry Co., Ltd., average particle size: 0.20 μm) and a 50% polyolefin dispersion (product name: CHEMIPEARL, Mitsui Chemicals, Inc.) were kneaded with a kneader at a ratio by mass of 100:100. These materials could not be sufficiently bonded to each other, and were less likely to be formed into a membrane. The membrane-forming properties were evaluated as 0 based on the above criteria.

Comparative Example 1-6

An amount of 145 parts by mass of hydrotalcite (trade name: DHT-6 produced by Kyowa Chemical Industry Co., Ltd., average particle size: 0.20 μm), 55 parts by mass of an aqueous dispersion of the (meth)acrylic based copolymer obtained in Preparation Example 1, 3 parts by mass of carboxymethylcellulose (trade name: DAICEL 1380 produced by Daicel FineChem Ltd.), and 10 parts by mass of pure water were kneaded with a kneader to prepare a uniform kneaded mixture. The resulting kneaded mixture was roll-pressed to a thickness of 100 μm, and heated 120° C. for 10 minutes. Thus, an anion conducting membrane was obtained. The membrane-forming properties were evaluated as 2 based on the above criteria.

The resulting anion conducting membrane had an air permeance (T) of 4,000 s, a piercing strength (F) of 1.9 N, a density (ρ) of 1.67 g/cm$^3$, and a thickness (L) of 100 μm. The X value determined from these values was 2538.

Further, the resulting anion conducting membrane had a liquid absorption rate of 16% and a degree of swelling of 11%.

The ratio of the combined area of the hydrotalcite particles to the combined area of the other components in the cross-section of the resulting anion conducting membrane was 74/26, and the proportion of the voids was 1.3%. The hydrotalcite particles in the anion conducting membrane had a cross-sectional particle size of 0.37 μm.

The resulting anion conducting membrane had a resistance (R) of 0.18Ω, and achieved 120 cycles in charge-discharge evaluation.

Comparative Example 1-7

An amount of 55 parts by mass of hydrotalcite (trade name: DHT-6 produced by Kyowa Chemical Industry Co., Ltd., average particle size: 0.20 μm), 145 parts by mass of an aqueous dispersion of the (meth)acrylic based copolymer obtained in Preparation Example 1, 3 parts by mass of carboxymethylcellulose (trade name: DAICEL 1380 produced by Daicel FineChem Ltd.), and 10 parts by mass of pure water were kneaded with a kneader to prepare a uniform kneaded mixture. The resulting kneaded mixture was roll-pressed to a thickness of 100 μm, and heated 120° C. for 10 minutes. Thus, an anion conducting membrane was obtained. The membrane-forming properties were evaluated as 1 based on the above criteria.

The resulting anion conducting membrane had an air permeance (T) of 30,000 s, a piercing strength (F) of 2.3 N, a density (ρ) of 1.33 g/cm$^3$, and a thickness (L) of 100 μm. The X value determined from these values was 137,655.

Further, the resulting anion conducting membrane had a liquid absorption rate of 15% and a degree of swelling of 11%.

The ratio of the combined area of the hydrotalcite particles to the combined area of the other components in the cross-section of the resulting anion conducting membrane was 27/73, and the proportion of the voids was 0.1%. The hydrotalcite particles in the anion conducting membrane had a cross-sectional particle size of 0.37 μm.

The resulting anion conducting membrane had a resistance (R) of 0.26Ω, and achieved 110 cycles in charge-discharge evaluation.

Example 1-28

An aqueous slurry of an anion conducting membrane-forming material was obtained in the same manner as in Example 1-27. The resulting aqueous slurry was applied with an applicator to a non-woven fabric (trade name: H-8007, produced by Japan Vilene Company, Ltd.) in an amount of 1 g/cm$^2$, and dried at 120° C. for 30 minutes. Thus, the non-woven fabric and the anion conducting membrane thereon were integrated to prepare an anion conducting membrane laminate.

The resulting anion conducting membrane laminate had an air permeance (T) of 30,000 s, a piercing strength (F) of 4.7 N, a density (ρ) of 1.23 g/cm$^3$, and a thickness (L) of 185 μm. The X value determined from these values was 140,619.

The resulting anion conducting membrane laminate had a liquid absorption rate of 11% and a degree of swelling of 0.8%.

The ratio of the combined area of the hydrotalcite particles to the combined area of the other components in the cross-section of the anion conducting membrane portion of the resulting anion conducting membrane laminate was 53/47, and the proportion of the voids was 0% relative to the total area of the cross-section of the membrane. The hydrotalcite particles in the anion conducting membrane had a cross-sectional particle size of 0.37 µm.

The resulting anion conducting membrane laminate had a resistance (R) of 0.14Ω, and when the resulting anion conducting membrane laminate was used as a separator in charge-discharge evaluation, 360 cycles were achieved.

Example 1-29

The anion conducting membrane obtained in Example 1-1 was placed on a non-woven fabric (trade name: H-8007 produced by Japan Vilene Company, Ltd.), and they were bonded to each other with a roll-type laminator. Thus, the non-woven fabric and the anion conducting membrane thereon were integrated to prepare an anion conducting membrane laminate. When the resulting anion conducting membrane laminate was used as a separator in charge-discharge evaluation, 340 cycles of charge and discharge were achieved.

Example 1-30

The resulting anion conducting membrane obtained in Example 1-22 was placed on a non-woven fabric (trade name: H-8007 produced by Japan Vilene Company, Ltd.), and they were bonded to each other with a roll-type laminator. Thus, the non-woven fabric and the anion conducting membrane thereon were integrated to prepare an anion conducting membrane laminate. When the resulting anion conducting membrane laminate was used as a separator in charge-discharge evaluation, 450 cycles were achieved.

As described above, cells having a longer life and suitable for long-term use were obtained by preparing an anion conducting membrane having the ratio of the combined area of the particles of the inorganic compound to the combined area of the other components of 70/30 to 30/70 using an anion conducting membrane-forming material containing a conjugated diene based polymer and/or a (meth)acrylic based polymer and particles of an inorganic compound such as hydrotalcite, and then forming a cell using the resulting anion conducting membrane.

2. Examples of the Second Aspect of the Invention
Example 2-1

An amount of 100 parts by mass of hydrotalcite (trade name: DHT-6 produced by Kyowa Chemical Industry Co., Ltd., average particle size: 0.20 µm), 35 parts by mass of an aqueous dispersion of a styrene-butadiene based copolymer (product name: TRD-2001 produced by JSR Corporation, solid content: 48%), 5 parts by mass of an aqueous dispersion of PTFE (trade name: D210C produced by Daikin Industries, Ltd., solid content: 60%), 3 parts by mass of carboxymethylcellulose (trade name: DAICEL 1380 produced by Daicel FineChem Ltd.), and 28 parts by mass of pure water were kneaded with a kneader to prepare a uniform kneaded mixture. The resulting kneaded mixture was roll-pressed. Thus, a 100-µm-thick anion conducting membrane was obtained.

The resulting anion conducting membrane had an air permeance (T) of 3,500 s, a piercing strength (F) of 0.7 N, a density (ρ) of 1.28 g/cm$^3$, and a thickness (L) of 102 µm. The X value determined from these values was 538.

Further, the resulting anion conducting membrane had a liquid absorption rate of 10% and a degree of swelling of 0.6%.

The ratio of the combined area of the hydrotalcite particles to the combined area of the other components in the cross-section of the anion conducting membrane portion of the resulting anion conducting membrane was 69/31, and the proportion of the voids was 4.8% relative to the total area of the cross-section of the membrane. The hydrotalcite particles in the anion conducting membrane had a cross-sectional particle size of 0.39 µm.

The resulting anion conducting membrane had a resistance (R) of 0.19Ω, and when the resulting anion conducting membrane was used as a separator in charge-discharge evaluation, 305 cycles were achieved.

Example 2-2

An amount of 100 parts by mass of hydrotalcite (trade name: DHT-6 produced by Kyowa Chemical Industry Co., Ltd., average particle size: 0.20 µm), 80 parts by mass of an aqueous dispersion of the (meth)acrylic based polymer obtained in Preparation Example 1, and 15 parts by mass of pure water were kneaded with a kneader to prepare a uniform kneaded mixture. The resulting kneaded mixture was roll-pressed at a roll gap of 100 µm to prepare an anion conducting membrane.

The resulting anion conducting membrane had an air permeance (T) of 4,300 s, a piercing strength (F) of 0.8 N, a density (ρ) of 1.24 g/cm$^3$, and a thickness (L) of 109 µm. The X value determined from these values was 841.

Further, the resulting anion conducting membrane had a liquid absorption rate of 18% and a degree of swelling of 1.5%.

The ratio of the combined area of the hydrotalcite particles to the combined area of the other components in the cross-section of the anion conducting membrane portion of the resulting anion conducting membrane was 59/41, and the proportion of the voids was 5.2% relative to the total area of the cross-section of the membrane. The hydrotalcite particles in the anion conducting membrane had a cross-sectional particle size of 0.43 µm.

The anion conducting membrane had a resistance (R) of 0.20Ω, and when the resulting anion conducting membrane was used as a separator in charge-discharge evaluation, 320 cycles were achieved.

Comparative Example 2-1

A battery cell was formed using a zinc negative electrode prepared by coating punched nickel with an active material that was a mixture of zinc oxide and PTFE kneaded at a ratio by mass of 96:4, a non-woven fabric (average thickness: 1000 µm) as a separator, a nickel positive electrode as a counter electrode, and a Ag/AgO electrode as a reference electrode.

The resulting anion conducting membrane had an air permeance (T) of 1 s, a piercing strength (F) of 12 N, a density (ρ) of 0.09 g/cm³, and a thickness (L) of 1000 μm. The X value determined from these values was 0.00001.

Comparative Example 2-2

A battery cell was formed using the same negative and positive electrodes as in Comparative Example 2-1 and an ion conducting membrane (average thickness: 25 μm) formed of a single microporous membrane formed using polyolefin and having an average pore diameter of 100 nm as a separator.

The resulting anion conducting membrane had an air permeance (T) of 380 s, a piercing strength (F) of 2.7 N, a density (ρ) of 0.5 g/cm³, and a thickness (L) of 25 μm. The X value determined from these values was 39.

Comparative Example 2-3

Hydrotalcite as an inorganic compound and a PTFE dispersion as a polymer (trade name: POLYFLON D-210 produced by Daikin Industries, Ltd.) were kneaded at a ratio by mass of 4:6 at 30° C. for three minutes to prepare a 50-μm-thick ion conducting membrane. A battery cell was formed using the same negative and positive electrodes as in Comparative Example 2-1 and the ion conducting membrane as a separator.

The resulting anion conducting membrane had an air permeance (T) of 1,400 s, a piercing strength (F) of 0.7 N, a density (ρ) of 1.3 g/cm³, and a thickness (L) of 50 μm. The X value determined from these values was 178.

3. Examples of the Third Aspect of the Invention

Example 3-1

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 48%), and pure water were kneaded with a kneader at a ratio by mass of 100:100:20. The kneaded mixture was roll-pressed. Thus, a 100-μm thick membrane was obtained. The resulting membrane was heated 80° C. for one hour and additionally heated at 120° C. for one hour to prepare an anion conducting membrane. The membrane-forming properties were evaluated as 2 based on the above criteria.

The resulting anion conducting membrane had an air permeance (T) of 30,000 s, a piercing strength (F) of 3.5 N, a density (ρ) of 1.51 g/cm³, and a thickness (L) of 100 μm. The X value determined from these values was 237,825.

Further, the resulting anion conducting membrane had a liquid absorption rate of 18% and a degree of swelling of 7%. The ratio of the combined area of the hydrotalcite particles to the combined area of the other components in the cross-section of the resulting anion conducting membrane was 54/46, and the proportion of the voids was 0.1%. The hydrotalcite particles in the anion conducting membrane had a cross-sectional particle size of 0.38 μm.

The resulting anion conducting membrane had a resistance (R) of 0.23Ω, and achieved 450 cycles in charge-discharge evaluation.

Example 3-2

Hydrotalcite (trade name: DHT-6 produced by Kyowa Chemical Industry Co., Ltd., average particle size: 0.20 μm), an aqueous dispersion of a styrene-butadiene based copolymer (product name: TRD2001 produced by JSR Corporation, Tg=−2° C., solid content: 48%), and pure water were kneaded with a kneader at a ratio by mass of 100:100:35. The kneaded mixture was roll-pressed. Thus, a 100-μm thick membrane was obtained. The resulting membrane was heated 80° C. for one hour, and additionally heated at 160° C. for one hour to prepare an anion conducting membrane. The membrane-forming properties were evaluated as 2 based on the above criteria.

The resulting anion conducting membrane had an air permeance (T) of 30,000 s, a piercing strength (F) of 3.5 N, a density (ρ) of 1.49 g/cm³, and a thickness (L) of 100 μm. The X value determined from these values was 234,675.

Further, the resulting anion conducting membrane had a liquid absorption rate of 12% and a degree of swelling of 8%. The ratio of the combined area of the hydrotalcite particles to the combined area of the other components in the cross-section of the resulting anion conducting membrane was 53/47, and the proportion of the voids was 0.2%. The hydrotalcite particles in the anion conducting membrane had a cross-sectional particle size of 0.38 μm.

The resulting anion conducting membrane had a resistance (R) of 0.24Ω, and achieved 380 cycles in charge-discharge evaluation.

Example 3-3

Hydrotalcite (trade name: DHT-6 produced by Kyowa Chemical Industry Co., Ltd., average particle size: 0.20 μm), an aqueous dispersion of a styrene-butadiene based copolymer (product name: TRD102A produced by JSR Corporation, Tg=−5° C., solid content: 48%), and pure water were kneaded with a kneader at a ratio by mass of 100:100:5. The kneaded mixture was roll-pressed. Thus, a 100-μm thick membrane was obtained. The resulting membrane was heated 80° C. for one hour and additionally heated at 160° C. for one hour to prepare an anion conducting membrane. The membrane-forming properties were evaluated as 2 based on the above criteria.

The resulting anion conducting membrane had an air permeance (T) of 30,000 s, a piercing strength (F) of 3.4 N, a density (ρ) of 1.54 g/cm³, and a thickness (L) of 100 μm. The X value determined from these values was 235,620.

Further, the resulting anion conducting membrane had a liquid absorption rate of 11% and a degree of swelling of 1%. The ratio of the combined area of the hydrotalcite particles to the combined area of the other components in the cross-section of the resulting anion conducting membrane was 55/45, and the proportion of the voids was 0.1%. The hydrotalcite particles in the anion conducting membrane had a cross-sectional particle size of 0.35 μm.

The resulting anion conducting membrane had a resistance (R) of 0.21Ω, and achieved 330 cycles in charge-discharge evaluation.

Example 3-4

Hydrotalcite (trade name: DHT-6 produced by Kyowa Chemical Industry Co., Ltd., average particle size: 0.20 μm), an aqueous dispersion of a styrene-butadiene based copolymer (product name: SR-152 produced by Nippon A&L Inc., solid content: 48%), and pure water were kneaded with a kneader at a ratio by mass of 100:100:20. The kneaded mixture was roll-pressed. Thus, a 100-μm thick membrane was obtained. The resulting membrane was heated 80° C. for one hour and additionally heated at 120° C. for one hour to prepare an anion conducting membrane. The membrane-forming properties were evaluated as 1 based on the above criteria.

The resulting anion conducting membrane had an air permeance (T) of 30,000 s, a piercing strength (F) of 3.2 N, a density ($\rho$) of 1.52 g/cm$^3$, and a thickness (L) of 100 µm. The X value determined from these values was 218,880.

Further, the resulting anion conducting membrane had a liquid absorption rate of 4% and a degree of swelling of 5%. The ratio of the combined area of the hydrotalcite particles to the combined area of the other components in the cross-section of the resulting anion conducting membrane was 54/46, and the proportion of the voids was 0.1%. The hydrotalcite particles in the anion conducting membrane had a cross-sectional particle size of 0.35 µm.

The resulting anion conducting membrane had a resistance (R) of 0.23Ω, and achieved 305 cycles in charge-discharge evaluation.

Example 3-5

Hydrotalcite (trade name: DHT-6 produced by Kyowa Chemical Industry Co., Ltd., average particle size: 0.20 µm), an aqueous dispersion of a styrene-butadiene based copolymer (product name: TRD2001 produced by JSR Corporation, solid content: 48%), and pure water were kneaded with a kneader at a ratio by mass of 100:50:5. The kneaded mixture was roll-pressed. Thus, a 100-µm thick membrane was obtained. The resulting membrane was heated 80° C. for 12 hours to prepare an anion conducting membrane. The membrane-forming properties were evaluated as 3 based on the above criteria.

The resulting anion conducting membrane had an air permeance (T) of 30,000 s, a piercing strength (F) of 3.4 N, a density ($\rho$) of 1.52 g/cm$^3$, and a thickness (L) of 100 µm. The X value determined from these values was 232,560.

Further, the resulting anion conducting membrane had a liquid absorption rate of 8% and a degree of swelling of 6%. The ratio of the combined area of the hydrotalcite particles to the combined area of the other components in the cross-section of the resulting anion conducting membrane was 55/45, and the proportion of the voids was 0.1%. The hydrotalcite particles in the anion conducting membrane had a cross-sectional particle size of 0.35 µm.

The resulting anion conducting membrane had a resistance (R) of 0.21Ω, and achieved 320 cycles in charge-discharge evaluation.

Example 3-6

Hydrotalcite (trade name: DHT-6 produced by Kyowa Chemical Industry Co., Ltd., average particle size: 0.20 µm), an aqueous dispersion of a styrene-butadiene based copolymer (product name: SR-152 produced by NIPPON A&L INC., solid content: 48%), and pure water were kneaded with a kneader at a ratio by mass of 100:100:20. The kneaded mixture was roll-pressed. Thus, a 100-µm thick membrane was obtained. The resulting membrane was heated 80° C. for one hour to prepare an anion conducting membrane. The membrane-forming properties were evaluated as 2 based on the above criteria.

The resulting anion conducting membrane had an air permeance (T) of 30,000 s, a piercing strength (F) of 3.1 N, a density ($\rho$) of 1.51 g/cm$^3$, and a thickness (L) of 100 µm. The X value determined from these values was 210,645.

Further, the resulting anion conducting membrane had a liquid absorption rate of 19% and a degree of swelling of 8%. The ratio of the combined area of the hydrotalcite particles to the combined area of the other components in the cross-section of the resulting anion conducting membrane was 55/45, and the proportion of the voids was 0.2%. The hydrotalcite particles in the anion conducting membrane had a cross-sectional particle size of 0.38 µm.

The resulting anion conducting membrane had a resistance (R) of 0.22Ω, and achieved 315 cycles in charge-discharge evaluation.

Example 3-7

Hydrotalcite (trade name: DHT-6 produced by Kyowa Chemical Industry Co., Ltd., average particle size: 0.20 µm), an aqueous dispersion of a styrene-butadiene based copolymer (product name: TRD-2001 produced by JSR Corporation, solid content: 48%), and pure water were kneaded with a kneader at a ratio by mass of 100:100:20. The kneaded mixture was roll-pressed. Thus, a 100-µm thick membrane was obtained. The resulting membrane was heated 80° C. for one hour to prepare an anion conducting membrane. The membrane-forming properties were evaluated as 2 based on the above criteria.

The resulting anion conducting membrane had an air permeance (T) of 30,000 s, a piercing strength (F) of 3.3 N, a density ($\rho$) of 1.51 g/cm$^3$, and a thickness (L) of 100 µm. The X value determined from these values was 224,235.

Further, the resulting anion conducting membrane had a liquid absorption rate of 21% and a degree of swelling of 9%. The ratio of the combined area of the hydrotalcite particles to the combined area of the other components in the cross-section of the resulting anion conducting membrane was 53/47, and the proportion of the voids was 0.1%. The hydrotalcite particles in the anion conducting membrane had a cross-sectional particle size of 0.36 µm.

The resulting anion conducting membrane had a resistance (R) of 0.21Ω, and achieved 310 cycles in charge-discharge evaluation.

Example 3-8

Hydrotalcite (trade name: DHT-6 produced by Kyowa Chemical Industry Co., Ltd., average particle size: 0.20 µm), an aqueous dispersion of a styrene-butadiene based copolymer (product name: TRD2001 produced by JSR Corporation, Tg=−2° C., solid content: 48%), and pure water were kneaded with a kneader at a ratio by mass of 100:100:35. The kneaded mixture was roll-pressed. Thus, a 100-µm thick membrane was obtained. The membrane-forming properties were evaluated as 1 based on the above criteria.

The resulting anion conducting membrane had an air permeance (T) of 30,000 s, a piercing strength (F) of 3.1 N, a density ($\rho$) of 1.51 g/cm$^3$, and a thickness (L) of 100 µm. The X value determined from these values was 210,645.

Further, the resulting anion conducting membrane had a liquid absorption rate of 28% and a degree of swelling of 31%. The ratio of the combined area of the hydrotalcite particles to the combined area of the other components in the cross-section of the resulting anion conducting membrane was 53/47, and the proportion of the voids was 0.2% or less. The hydrotalcite particles in the anion conducting membrane had a cross-sectional particle size of 0.37 µm.

The resulting anion conducting membrane had a resistance (R) of 0.21Ω, and achieved 240 cycles in charge-discharge evaluation.

Comparative Example 3-1

Hydrotalcite (trade name: DHT-6 produced by Kyowa Chemical Industry Co., Ltd., average particle size: 0.20 µm), an aqueous dispersion of polytetrafluoroethylene (trade name: D210C produced by Daikin Industries, Ltd., solid content: 60%), and pure water were kneaded with a kneader at a ratio by mass of 100:120:50. The kneaded mixture was roll-pressed. Thus, a 100-μm thick membrane was obtained. The membrane-forming properties were evaluated as 3 based on the above criteria.

The resulting anion conducting membrane had an air permeance (T) of 1,500 s, a piercing strength (F) of 0.7 N, a density (ρ) of 1.3 g/cm$^3$, and a thickness (L) of 100 μm. The X value determined from these values was 102.

Further, the resulting anion conducting membrane had a liquid absorption rate of 26% and a degree of swelling of 12%. In the cross-section of the resulting anion conducting membrane, only the hydrotalcite particles and voids were observed and no anion conducting membrane-forming material components other than the particles of the compound were observed. The proportion of the area of the voids was 5.2%. The hydrotalcite particles in the anion conducting membrane had a cross-sectional particle size of 0.41 μm.

The resulting anion conducting membrane had a resistance (R) of 0.20Ω, and achieved 180 cycles in charge-discharge evaluation.

As described above, cells having a much longer life and suitable for longer-term use were obtained by preparing an anion conducting membrane having a liquid absorption rate of 25% or less using an anion conducting membrane-forming material containing a conjugated diene based polymer and/or a (meth)acrylic based polymer and particles of an inorganic compound such as hydrotalcite, and forming a cell using the resulting anion conducting membrane.

The invention claimed is:

1. An anion conducting membrane formed using an anion conducting membrane-forming material,
    the anion conducting membrane-forming material comprising:
    a conjugated diene based polymer and/or a (meth)acrylic based polymer; and
    a compound containing at least one element selected from Groups I to XVII of the periodic table,
    the anion conducting membrane having a cross-section in which a ratio of a combined area of particles of the compound containing at least one element selected from Groups I to XVII of the periodic table to a combined area of the components of the anion conducting membrane-forming material other than the compound (particles of the compound/components of the anion conducting membrane-forming material other than the compound) is 70/30 to 30/70,
    the (meth)acrylic based polymer containing as a major constituent a monomer unit derived from a C1-C12 alkyl group-containing (meth)acrylic acid alkyl ester monomer, and
    the anion conducting membrane satisfying a value X represented by the following equation (1) of 1000 or more:

$$X = 0.005 \times \frac{T^2 \times F \times \rho}{L} \quad (1)$$

wherein T represents the air permeance (s); F represents the piercing strength (N); ρ represents the density (g/cm$^3$); and L represents the average membrane thickness (μm).

2. The anion conducting membrane according to claim 1, wherein the particles of the compound containing at least one element selected from Groups I to XVII of the periodic table in the cross-section of the anion conducting membrane have an average cross-sectional particle size of 0.1 to 1.0 μm.

3. The anion conducting membrane according to claim 1, wherein the compound containing at least one element selected from Groups I to XVII of the periodic table is at least one compound selected from the group consisting of oxides, hydroxides, layered double hydroxides, and phosphoric acid compounds.

4. The anion conducting membrane according to claim 1, wherein the compound containing at least one element selected from Groups I to XVII of the periodic table is a hydroxide and/or layered double hydroxide.

5. The anion conducting membrane according to claim 1, wherein the conjugated diene based polymer is a styrene-butadiene based copolymer.

6. The anion conducting membrane according to claim 1, wherein the anion conducting membrane-forming material further comprises at least one selected from the group consisting of halogen-containing polymers, carboxy group-containing polymers, hydroxy group-containing polymers, and polyolefins.

7. The anion conducting membrane according to claim 1, wherein the membrane has a multilayer structure.

8. The anion conducting membrane according to claim 1, wherein the membrane has a liquid absorption rate of 1% or more for a 6.7 mol/L KOH aqueous solution saturated with zinc oxide.

9. A cell component comprising the anion conducting membrane according to claim 1.

10. The cell component according to claim 9, wherein the cell component is a separator.

11. A cell comprising the cell component according to claim 9.

12. The anion conducting membrane according to claim 1, wherein the conjugated diene based polymer contains at least one functional group selected from the group consisting of an ester group, a hydroxy group, and a carboxy group.

13. The anion conducting membrane according to claim 1, wherein the conjugated diene based polymer has a glass transition temperature of −20° C. or higher.

14. The anion conducting membrane according to claim 1, wherein the conjugated diene based polymer has a glass transition temperature of 50° C. or lower.

15. The anion conducting membrane according to claim 1, wherein the proportion by mass of the conjugated diene based polymer and the (meth)acrylic based polymer falls within the range of 1% by mass or more and 99% by mass or less per 100% by mass of the anion conducting membrane-forming material.

16. A separator comprising a laminated structure of the anion conducting membrane according to claim 1 and an additional separator member other than the anion conducting membrane.

17. The separator according to claim 16, wherein the additional separator member is non-woven fabric.

18. The cell according to claim 11, wherein the cell comprises a water-containing electrolyte solution.

19. The cell according to claim 11, wherein the cell comprises an aqueous electrolyte solution.

\* \* \* \* \*

UNITED STATES PATENT AND TRADEMARK OFFICE
CERTIFICATE OF CORRECTION

PATENT NO. : 10,804,518 B2  
APPLICATION NO. : 15/579094  
DATED : October 13, 2020  
INVENTOR(S) : Tokushima et al.

Page 1 of 1

It is certified that error appears in the above-identified patent and that said Letters Patent is hereby corrected as shown below:

On the Title Page

(30) Between Foreign Application Priority Data and Oct 29, 2015 (JP)..............................2015-213143 Insert:  
--Jun 3, 2015 (JP)...............................2015-113333  
Jul 24, 2015 (JP) .............................2015-147117--

Signed and Sealed this  
Fifth Day of January, 2021

Andrei Iancu  
*Director of the United States Patent and Trademark Office*